United States Patent
Okazawa et al.

(10) Patent No.: US 7,496,951 B2
(45) Date of Patent: Feb. 24, 2009

(54) NETWORK APPARATUS AND CONTROL METHOD THEREFOR

(75) Inventors: Takashi Okazawa, Tokyo (JP); Hiroharu Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 670 days.

(21) Appl. No.: 10/887,823

(22) Filed: Jul. 12, 2004

(65) Prior Publication Data
US 2005/0015498 A1 Jan. 20, 2005

(30) Foreign Application Priority Data
Jul. 15, 2003 (JP) ............... 2003-197268
Jul. 15, 2003 (JP) ............... 2003-197269

(51) Int. Cl.
*H04L 9/32* (2006.01)
(52) U.S. Cl. ............................ 726/3; 726/4; 726/5
(58) Field of Classification Search ............ None
See application file for complete search history.

(56) References Cited

U.S. PATENT DOCUMENTS

| | | | | |
|---|---|---|---|---|
| 6,700,677 B1 | 3/2004 | Onodera et al. | ............ | 358/1.15 |
| 6,990,660 B2 * | 1/2006 | Moshir et al. | ............... | 717/171 |
| 2002/0095508 A1 | 7/2002 | Okazawa | ............... | 709/230 |
| 2002/0124059 A1 | 9/2002 | Takahashi | ............... | 709/219 |
| 2002/0184372 A1 * | 12/2002 | Ishikawa et al. | ............ | 709/227 |
| 2005/0254652 A1 * | 11/2005 | Engler et al. | ............... | 380/270 |

FOREIGN PATENT DOCUMENTS

JP 2000-298561 10/2000

OTHER PUBLICATIONS

U.S. Appl. No. 09/363,025, filed Jul. 29, 1999.
U.S. Appl. No. 09/662,606, filed Sep. 14, 2000.

* cited by examiner

*Primary Examiner*—Pramila Parthasarathy
(74) *Attorney, Agent, or Firm*—Fitzpatrick, Cella, Harper & Scinto

(57) ABSTRACT

A network apparatus which is detachable from a data processing apparatus and is mounted in the data processing apparatus to connect the data processing apparatus and a network installs an application and stores authentication information corresponding to the application in the storage of the network apparatus. The network apparatus acquires authentication information corresponding to the application from the storage of the network apparatus and the data processing apparatus in accordance with an application activation request. The network apparatus determines, on the basis of the acquired authentication information, whether to permit activation of the application.

3 Claims, 26 Drawing Sheets

FIG. 3

```
public class SampleApp {
    public static void main(Stirng args[]) {
        int result;
        result=printer.outdata("Test");
        System.out.println("Result="+result);
    }
}
```

- 301 (pointing to `result=printer.outdata("Test");`)
- 302 (pointing to `System.out.println("Result="+result);`)

FIG. 8

31　　　　　　　　　　　　　　　　　　　　　　　　　　　0(bit)

| FUNCTION RETURN VALUE [NORMAL END (0)]/ UNREGISTERED FUNCTION (1)/PROCESS ERROR (2)/ILLICIT CALL ARGUMENT (3)] |
|---|
| RESPONSE DATA TYPE [NUMERIC (0)/ CHARACTER STRING (1)] |
| RESPONSE DATA SIZE (NUMBER OF BYTES) |
| RESPONSE DATA AREA |
| ⋮ |
| RESPONSE DATA AREA |

| | NETWORK CARD |
|---|---|
| APPLICATION A | 347583001 |
| APPLICATION B | 908347802 |
| APPLICATION C | 491170055 |

| | PRINTING APPARATUS |
|---|---|
| APPLICATION A | 347583001 |
| APPLICATION B | 908347802 |
| APPLICATION C | 493830004 |

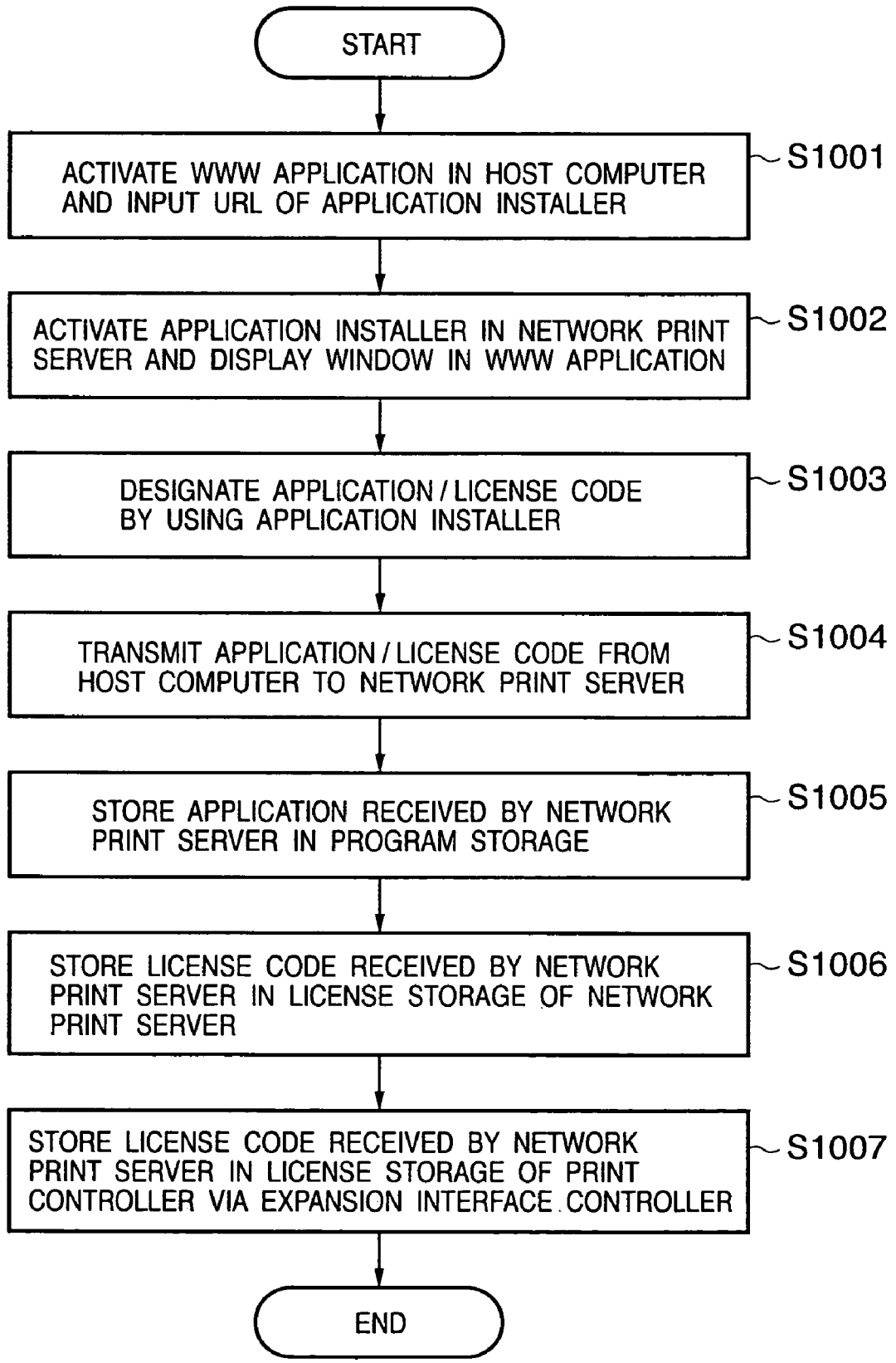

FIG. 11

INSTALL APPLICATION / LICENSE
ENTER APPLICATION TO BE INSTALLED AND LICENSE CODE,
AND CLICK [OK]

APPLICATION FILE
PATH : [          ]  LOOK IN...

LICENSE CODE
CODE : [          ]

OK   CANCEL

FIG. 15A

| | NETWORK CARD |
|---|---|
| APPLICATION A | 49560034-020101 |

FIG. 15B

| | PRINTING APPARATUS |
|---|---|
| APPLICATION A | 49560034-020101 |

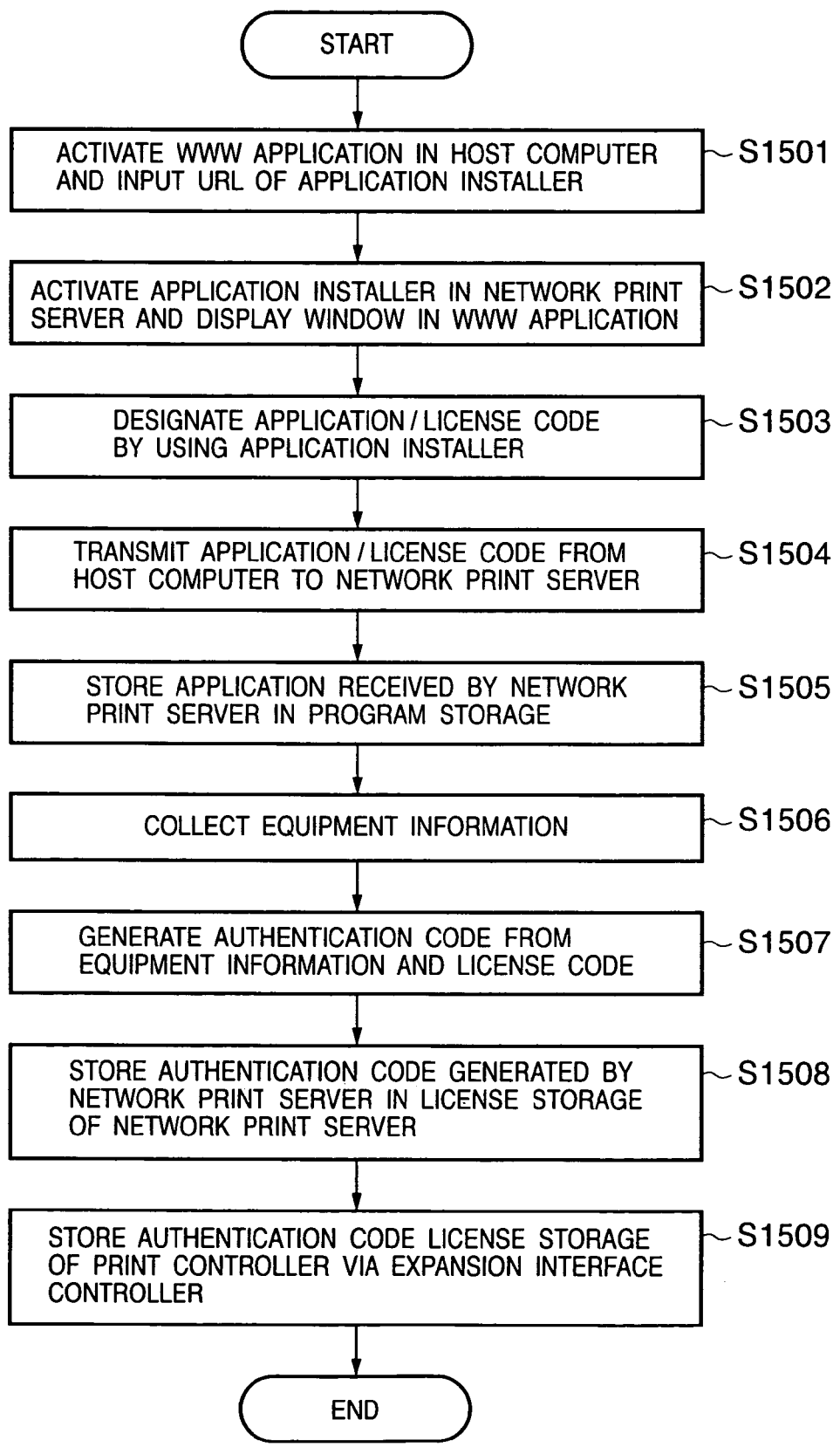

49560034-000101
- HDD : EXIST
- DOUBLE-SIDED UNIT : EXIST
- NUMBER OF PAPER CASSETTES : 0

49560034-010101
- HDD : EXIST
- DOUBLE-SIDED UNIT : EXIST
- NUMBER OF PAPER CASSETTES : 1

49560034-020101
- HDD : EXIST
- DOUBLE-SIDED UNIT : EXIST
- NUMBER OF PAPER CASSETTES : 2

FIG. 23A

BEFORE CONVERSION:

```
public class SampleApp2 {
    public static void calibration(Stirng args[]) {
        int result;
        result=printer.color_calibration();
        return result;
    }
}
```

FIG. 23B

AFTER CONVERSION:

```
public class SampleApp2 {
    public static void calibration(Stirng args[]) {
        int result;
        result=printer.mono_calibration();
        return result;
    }
}
```

NETWORK APPARATUS AND CONTROL METHOD THEREFOR

CLAIM OF PRIORITY

This application claims priorities from Japanese Patent Application Nos. 2003-197268 and 2003-197269 filed on Jul. 15, 2003 the entire contents of which are incorporated herein by reference.

FIELD OF THE INVENTION

The present invention relates to a network apparatus mountable in a data processing apparatus such as a printer, and a control method therefor.

BACKGROUND OF THE INVENTION

With recent spread of the Internet, it becomes popular to use a data processing apparatus such as a printing apparatus, copying machine, or facsimile apparatus while connecting it to a network. For example, as for a printing apparatus, high-end apparatuses such as a high-speed apparatus and color printing apparatus tend to incorporate a network interface. However, a low-end monochrome printing apparatus does not incorporate any network interface in the main body, and the network interface is generally supplied as a separate network card module.

In this case, the printing apparatus main body and network card module take intelligent forms individually having CPUs. Normally, the network card module is equipped with a print server function which performs comprehensive control of various print services via a network. The network card module communicates with the printing apparatus via a connection interface to realize a desired service.

From the viewpoint of the printing apparatus, heavy-load network services can depend on the network card module. This allows relatively degrading the performance of the CPU of the printing apparatus main body, that of a peripheral IC, and the like, and thus reducing the cost of the printing apparatus main body.

A conventional network interface suffices to transmit print data represented by, e.g., LPR (Line Printer Daemon Protocol: a remote print protocol used to share a printer by TCP/IP). These days, these is a strong need for information management with respect to the printing apparatus, and various means are provided as optional techniques.

The simplest example is to add information management data (job control language=Job Language) to a port for transmitting print data. The job control language takes a form in which the port for transmitting print data is shared. No service port need be added, and the job control language can be relatively easily mounted. However, when a large amount of data is transmitted during reception of print data, the port is occupied, and exchange of information management data stops. In a one-way connection using an LPR protocol or the like in the network, no information can be acquired.

Another method uses SNMP/MIB. This is an MIB (Management Information Base) using a port dedicated to exchange data and a standard SNMP (Simple Network Management Protocol). This method requires development of a dedicated client program for receiving SNMP and providing a user interface. Further, this method employs a protocol which performs simple information exchange, and thus can provide only a simple database of figures, character strings, or the like. Information which forms a graphical user interface (GUI) using, e.g., a bitmap image representing a device configuration must be held in the client program. For this reason, the client program must be made to comply with each model.

In recent years, a method using an HTTP protocol is becoming a major stream. According to this method, the network card module provides the client with WEB contents such as HTML data and a bitmap image associated with device information by using an HTTP service. The client displays WEB contents provided by the network card module by using a general WEB browser, and implements a GUI. If the GUI enables operation, the same effects as those obtained by using a dedicated client program can be obtained without providing any individual client program. A dedicated client program must manage various pieces of information (message character string, bitmap image, and the like) unique to the device. To the contrary, the above method in which the device suffices to hold only its model information is most suitable for providing a product within a short period of time.

However, all the above-mentioned methods only provide static functions incorporated in the network card module in advance. These methods cannot add a function later, or add a dynamic service of changing a control method by an incorporated function.

To solve this problem, Japanese Patent Laid-Open No. 2000-298561 proposes a system which acquires an application program operable in a data processing apparatus from an external device on a network and executes the application program. There is also recently proposed a platform technique capable of incorporating in a device an application program module created using the Java (registered trademark available from Sun Microsystems, Inc.) language, and activating the application program module in a Java virtual machine mounted in the device. By using this technique, a new function can be added later to a function-embedded device such as a printing apparatus.

The Java virtual machine comprises application program interfaces (API) in order to provide various functions necessary to control a function-embedded device, in addition to a network communication function. An application program module created by the Java language invokes these APIs, controls the function-embedded device, and processes requests from a host computer connected via a network.

The APIs provided on the Java virtual machine include functions necessary for network communication, and share a basic module which processes network communication protocols. Network communication can also be implemented by mounting the Java environment in an intelligent network card module.

The intelligent network card module having a CPU separately from a printing apparatus main body generally requires a design sharable between printing apparatuses of a plurality of models (connectable to printing apparatuses of a plurality of types) for the purpose of reduction of the development cost by commonality and reduction of the production cost by mass production.

A network card module used in a given printing apparatus can also be mounted in another printing apparatus. In this case, an application program installed in the network card module in an environment in which the module has previously been mounted may be kept installed. The application program is more likely to be unlimitedly used unless its activation is limited by any means when the added application program activates. This is not preferable for the application program supplier.

When the model of a printing apparatus in which the network module has previously been mounted and that of a current printing apparatus are different, an application program module which does not function or is unnecessary in the current model may be added. In this case, the application program module which does not function in the current printing apparatus may be activated.

Even for the same model, an application program module which does not function or is unnecessary in the equipment of the current printing apparatus owing to the difference in optional equipment may be added. Also in this case, the application program module which does not function in the equipment of the current printing apparatus may be activated.

In order to connect a network card module to apparatuses of a plurality of models, the network card module must hold all pieces of information such as a message corresponding to each model, resource data such as a bitmap image of a printing apparatus necessary for a graphical user interface, and information unique to each model. The ROM capacity necessary to store these pieces of information increases, raising the cost.

Depending on the type of application program module running in the Java virtual machine, some application program modules function in only a specific model, or some application program modules are necessary in only a specific model (these programs will be called model-dependent application programs). Holding model-dependent application programs in the network card module poses problems in efficient use of the storage area in addition to an increase in ROM capacity.

Considering a network card module having the above-described Java application program function, when the network card module is moved from an environment in which the module has been mounted and used once in a given printing apparatus main body to another environment, the network card module may malfunction depending on the difference between the functions of connected printing apparatus main bodies or values set in the previous environment. Even if no malfunction occurs, the resource may be wasted.

It may be difficult to give the printer a resource later when the printing apparatus main body has already been commercially available.

SUMMARY OF THE INVENTION

The present invention has been made to overcome the conventional drawbacks, and has as its object to limit activation of an application program which a specific data processing apparatus is permitted to use or an application program depending on a specific data processing apparatus, and prevent unlimited use of an application or activation of an application which does not match the apparatus in a network apparatus detachable from a data processing apparatus.

It is another object of the present invention to solve any error upon movement or wasteful use of the resource. More specifically, the object is to allow automatically switching an application to be activated in accordance with the function or ability of a printer/system, eliminate the need for replacing an application upon movement, and solve generation of any error and wasteful use of the resource.

It is still another object of the present invention to solve wasteful use of the resource by automatically deleting an unnecessary application from applications which have already been registered upon movement or performing an automatic update process.

It is still another object of the present invention to allow adding a new function which has not been provided to a printing apparatus main body by an application by performing some processes of a model-dependent part by the network module or controlling an external peripheral device connected to the network module.

A network apparatus according to one aspect of the present invention for achieving at least one of the above objects has the following arrangement. That is, there is provided a network apparatus which is detachable from a data processing apparatus and is mounted in the data processing apparatus to connect the data processing apparatus and a network, comprising: an installation unit configured to install an application and store authentication information corresponding to the application in a storage of the network apparatus; an acquisition unit configured to acquire authentication information corresponding to an application whose activation is designated, from the storage of the network apparatus and the data processing apparatus in which the network apparatus is mounted; and a permission unit configured to permit activation of the application on the basis of the authentication information acquired by the acquisition unit.

Also, a network apparatus control method according to another aspect of the present invention for achieving at least one of the above objects has the following arrangement. That is, there is provided a control method for a data processing system including a data processing apparatus and a network apparatus which is detachable from the data processing apparatus and is mounted in the data processing apparatus to connect the data processing apparatus and a network, comprising: an installation step of installing an application and storing authentication information corresponding to the application in a storage of the network apparatus and a storage of the data processing apparatus; an acquisition step of acquiring authentication information corresponding to an application whose activation is designated, from the storage of the network apparatus and the storage of the data processing apparatus in which the network apparatus is mounted; and a step of permitting activation of the application on the basis of the authentication information acquired in the acquisition step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of the source code description of an application program;

FIG. 8 is a view showing the format of an instruction process result sent back from the printer controller;

FIGS. 9A and 9B are tables for explaining the license code holing state according to the first embodiment;

FIG. 10 is a flowchart for explaining an application program installation process according to the first embodiment;

FIG. 11 is a view showing an example of a GUI displayed on a host computer in the application program installation process according to the first embodiment;

FIGS. 15A and 15B are tables for explaining the license code holing state according to the fourth embodiment;

FIG. 16 is a flowchart for explaining an application program installation process according to the fourth embodiment;

FIGS. 23A and 23B are views for explaining command conversion according to the eighth embodiment;

DETAILED DESCRIPTION OF THE PREFERRED EMBODIMENTS

Preferred embodiments of the present invention will now be described in detail in accordance with the accompanying drawings.

First Embodiment

Figure 1:
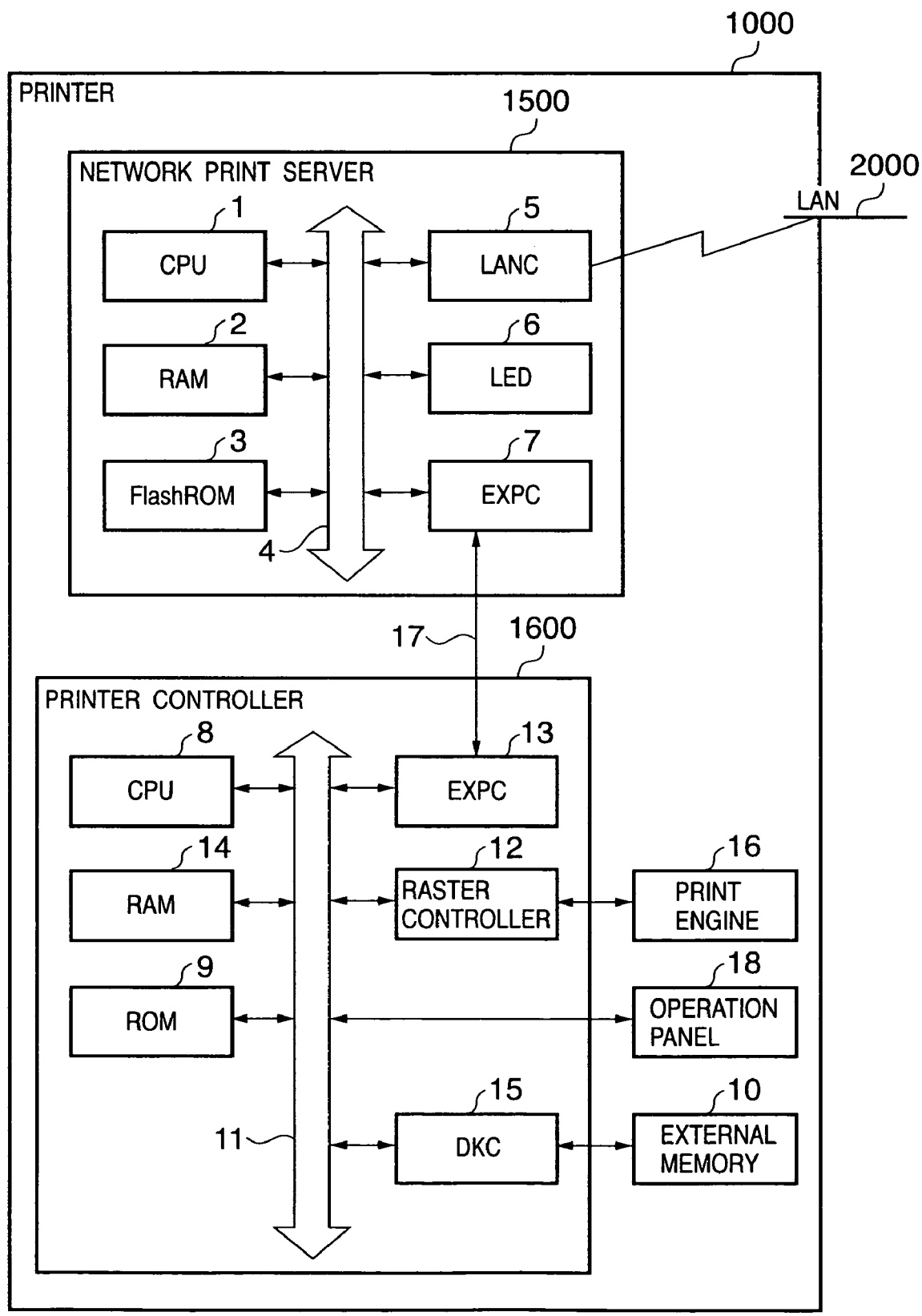
FIG. 1 is a block diagram showing the hardware configuration of a printing system according to the first embodiment.

FIG. 1 is a block diagram for explaining the hardware configuration of a printing system according to the first embodiment. Reference numeral 1000 denotes a printer which is roughly formed from a network print server 1500 and printer controller 1600. The network print server 1500 and printer controller 1600 have independent control systems.

Figure 4:
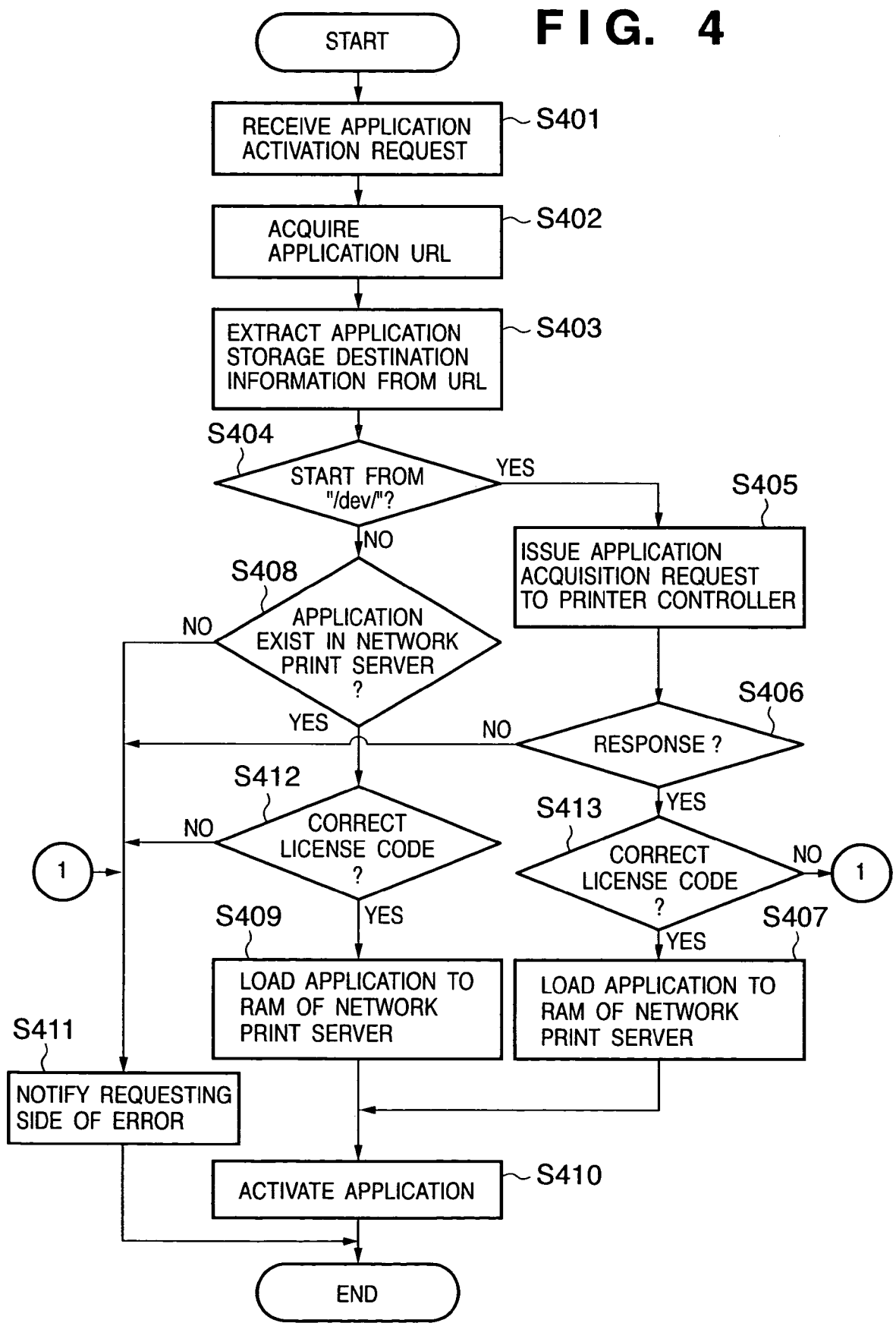
FIG. 4 is a flowchart showing an application program activation process method according to the first embodiment.
Figure 5:
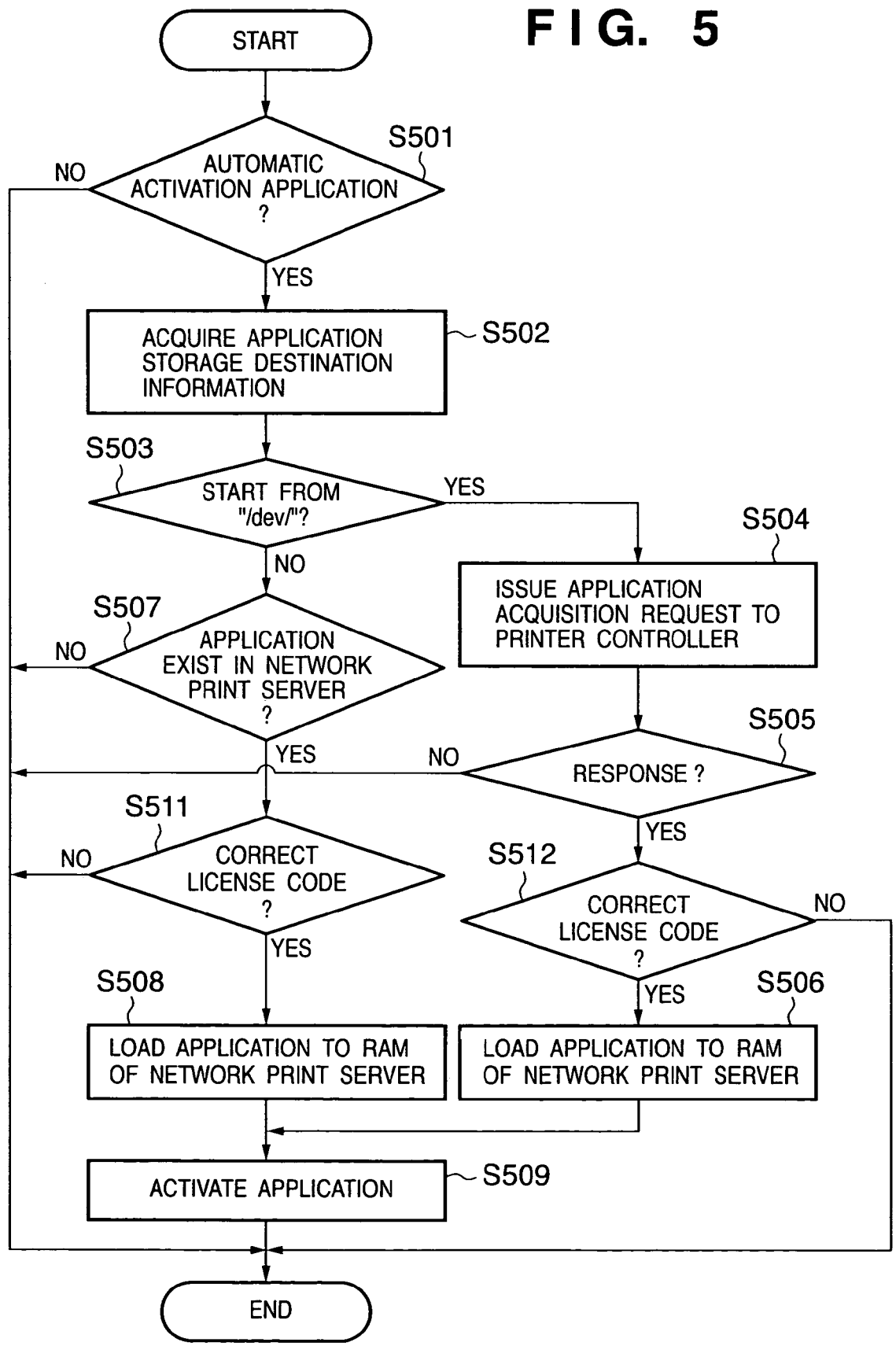
FIG. 5 is a flowchart showing an application program activation process method according to the second embodiment.
Figure 6:
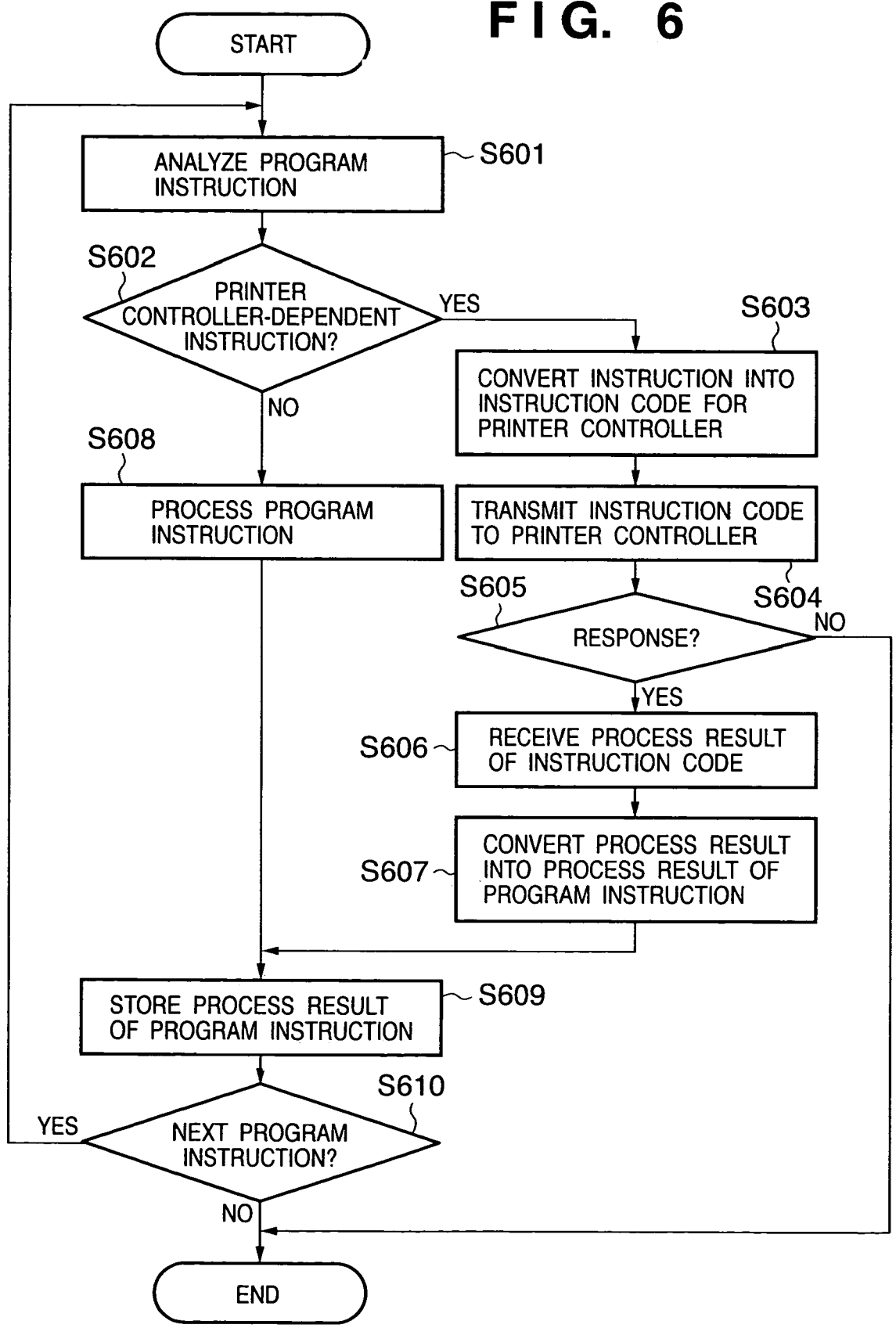
FIG. 6 is a flowchart showing a process method for an instruction described in an application program according to the third embodiment.

The network print server 1500 is a network apparatus which is implemented in the form of a network board module and is detachable from the printer 1000. In the network print server 1500, reference numeral 1 denotes a network print server CPU which executes various control operations on the basis of a control program stored in a rewritable Flash ROM 3. By using a predetermined network communication protocol, the CPU 1 communicates with an external device (not shown) such as a host computer connected to a local area network (LAN 2000) via a network controller (LANC 5) connected to a system bus 4. The CPU 1 comprehensively controls, for example, exchange of various data such as print data and a printer control instruction sent from the external device, and performs proper data transfer control with respect to a printer controller 1501 connected via an expansion interface controller (EXPC 7). The Flash ROM 3 stores control programs as shown in the flowcharts of FIGS. 4, 5, and 6 which are executed by the CPU 1.

A RAM 2 is used as a temporary storage area such as a main memory or work area for the CPU 1. An LED 6 is used as a display representing the operating state of the network print server. For example, the LED 6 can represent, by the flickering pattern or color of the LED, various operating states such as an electrical connection state (LINK) between the network controller (LANC 5) and the local area network (LAN 2000), and a network communication mode (10Base, 100Base, full-duplex, or half-duplex).

An expansion interface 17 is an interface for connecting the network print server 1500 and printer controller 1600. The expansion interface 17 includes a connector (not shown). The network print server 1500 can be dismounted from the printer 1000 (printer controller 1600) at the connector. The network print server 1500 can also be mounted in another printer having the same configuration.

In the printer controller 1600, reference numeral 8 denotes a printer controller CPU which comprehensively controls access to various devices connected to a system bus 11. Under the control of the CPU 8, a raster controller 12 generates an output image signal on the basis of print data received from the network print server 1500 via an expansion interface controller (EXPC 13), and outputs the image signal to a print engine 16. This process is implemented when the CPU 8 operates on the basis of a control program and the like which are stored in a ROM 9, or a control program, resource data (resource information), and the like which are stored in an external memory 10 connected via a disk controller (DKC 15).

Reference numeral 14 denotes a RAM functioning as a main memory, work area, or the like for the CPU 8. The memory capacity can be expanded by an optional RAM connected to an expansion port (not shown). Reference numeral 18 denotes an operation panel having buttons for, e.g., setting the operation mode of the printer 1000 and deleting print data, and a display such as a liquid crystal panel or LED representing the operating state of the printer 1000. The print engine 16 shown in FIG. 1 utilizes an existing printing technique. Examples of a preferable implementation are electrophotography (laser beam printing), ink-jet printing, and sublimatic printing (thermal transfer printing).

Figure 2:
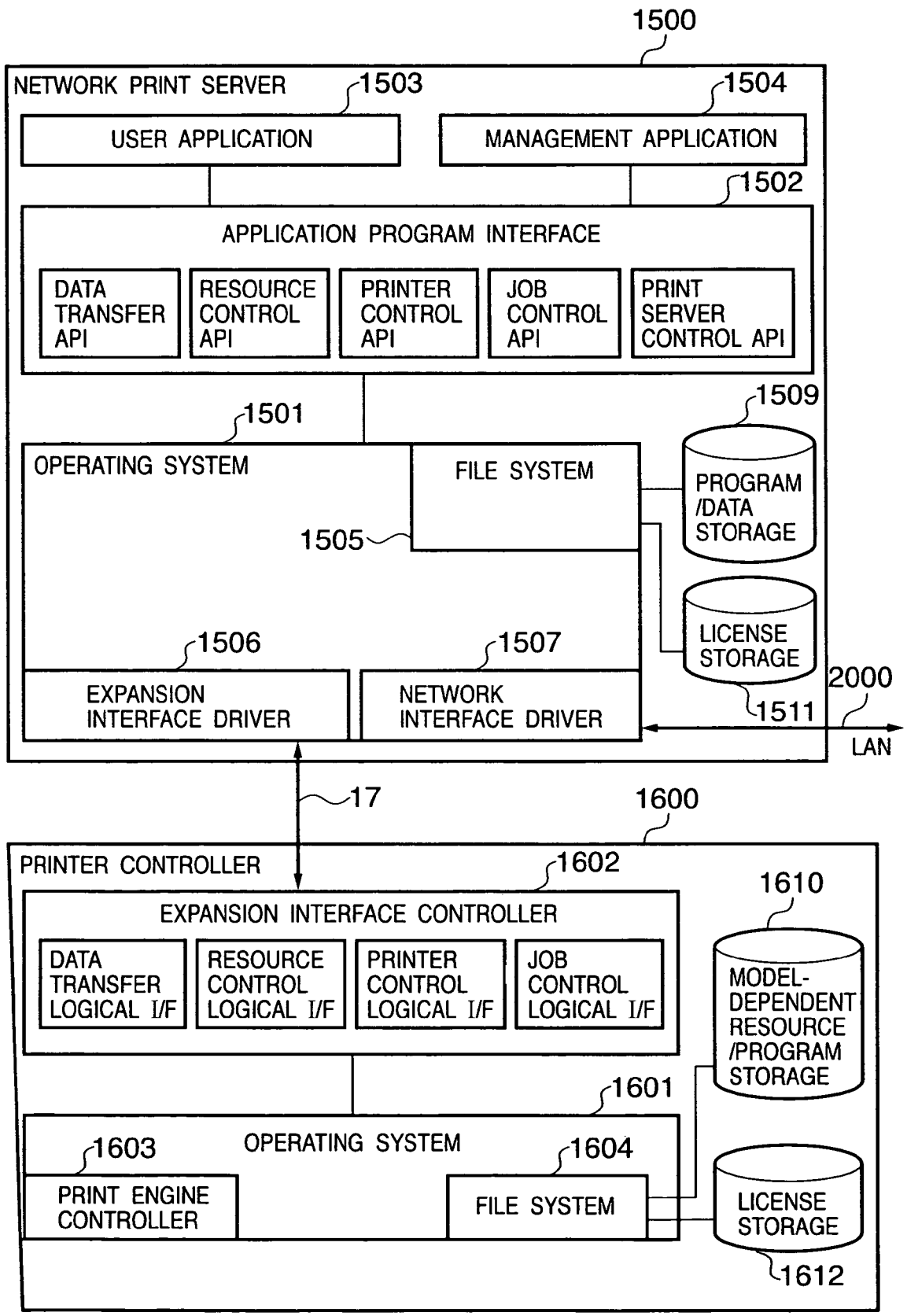
FIG. 2 is a block diagram showing the software configuration of the printing system according to the first embodiment.

FIG. 2 is a block diagram for explaining the software configurations of control programs which are stored in the storages (e.g., the Flash ROM 3 and ROM 9) of the network print server 1500 and printer controller 1600 shown in FIG. 1. These control programs are analyzed and executed by the CPUs 1 and 8.

In the network print server 1500, reference numeral 1501 denotes an operating system which comprehensively performs basic data input/output control of the network print server 1500. The operating system 1501 includes a file system 1505 which controls input/output to/from a program/data storage 1509, an expansion interface driver 1506 which controls communication via the printer controller 1600 and expansion interface 17, and a network interface driver 1507 which communicates with an external device (not shown) such as a host computer via the communication medium of the local area network (LAN 2000). The program/data storage 1509 is formed from, e.g., the Flash ROM 3.

Figure 7:
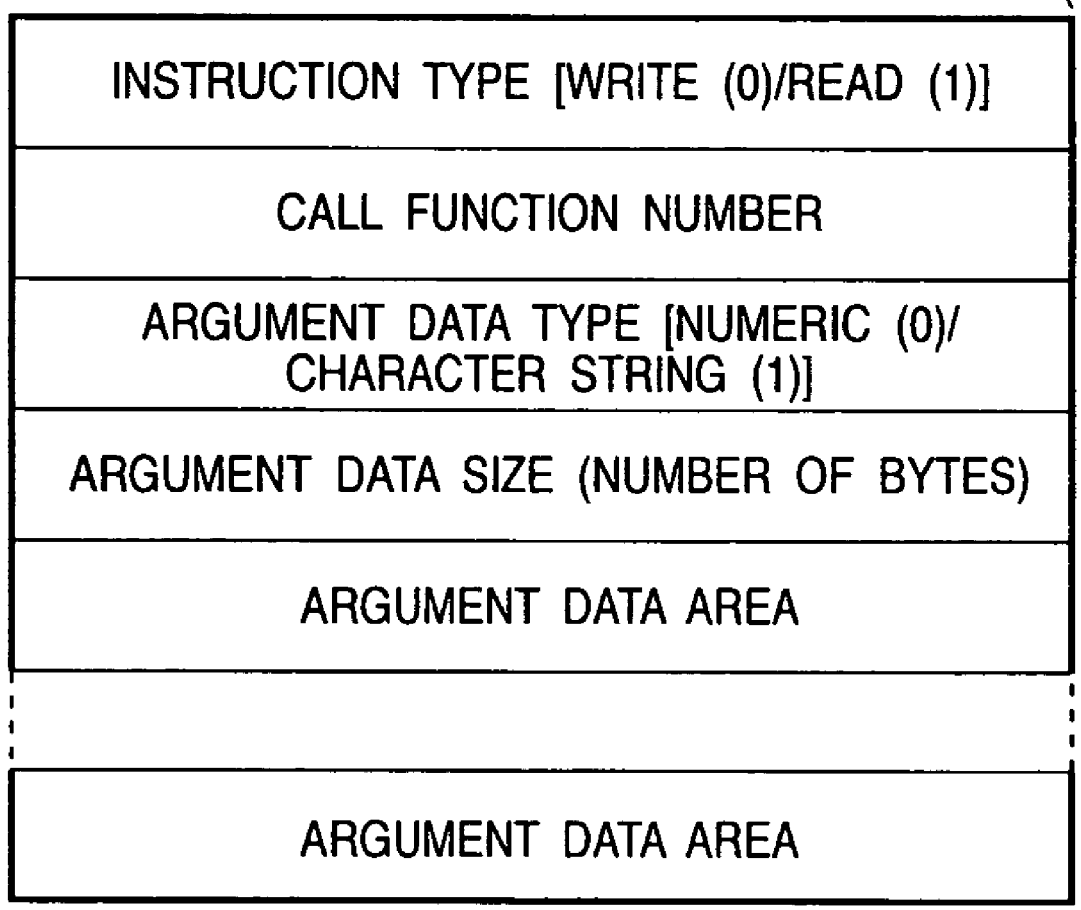
FIG. 7 is a view showing the format of an instruction code for a printer controller.

Reference numeral 1502 denotes an application program interface (API). The API 1502 provides various functions of the operating system 1501 to application programs such as a user application 1503, management application 1504, and other control programs which run in the network print server 1500. The management application 1504 registers and manages the printer 1000 and user application. The API 1502 includes a data transfer API which provides a print data exchange function, a resource control API which controls input/output of resource data such as a bitmap image, display message, and application program, a printer control API which controls reactivation of the printer 1000, initialization and setting of set values, and the like, a job control API which controls cancellation of a print job, a re-print instruction, and the like, and a print server control API which performs reactivation of the network print server 1500, initialization and setting of set values, and activation, registration, and deletion of an application program. Instructions provided by the data transfer API, resource control API, printer control API, and job control API are converted into an instruction format as shown in FIG. 7 as printer controller-dependent instructions, and then transferred to the printer controller via the expansion interface 17.

Reference numeral 1511 denotes a license storage which stores license information input in installing an application program, in correspondence with each application program, as shown in FIG. 9A.

In the printer controller 1600, reference numeral 1601 denotes an operating system which comprehensively controls various processes of the printer controller 1600. The operating system 1601 has a print engine controller 1603 and file system 1604. The print engine controller 1603 controls communication with the print engine. The file system 1604 controls input/output to/from a model-dependent resource/program storage 1610. The model-dependent resource/program storage 1610 stores model-dependent resources such as a bitmap image and error message referred to by the network print server 1500, and model-dependent application programs and the like which run in the network print server 1500.

Reference numeral 1602 denotes an expansion interface controller which controls communication with the network print server 1500 via the expansion interface 17. The expansion interface controller 1602 comprises a logical interface corresponding to the type of control. For example, the expansion interface controller 1602 comprises a data transfer logical interface which controls input/output of print data, a resource control logical interface which controls input/output of various data stored in the model-dependent resource/program storage 1610, a printer control logical interface which controls reactivation of the printer 1000, initialization and setting of set values, and the like, and a job control logical interface which controls cancellation of a print job, a re-print instruction, and the like. Each logical interface transfers an instruction issued from the network print server 1500 to the operating system 1601, and sends back the process result to the network print server 1500.

Reference numeral 1612 denotes a license storage which stores license information input in installing an application program, in correspondence with each application program, as shown in FIG. 9B.

FIG. 3 shows an example of the description of an application program which runs in the network print server 1500. FIG. 3 shows an example of a description by the Java language as a preferable example of the first embodiment. A line 301 in FIG. 3 invokes the data transfer API shown in FIG. 2, and "printer.outdata("Test")" represents the data transfer API. This line describes a printer controller-dependent instruction to print text data "Test" as print data by the print engine via the printer controller. When the printer controller 1600 executes the process in accordance with the instruction, the process result received from the controller is converted into a numeric in a variable "result" and stored.

A line 302 shown in FIG. 3 represents an example of the description of an instruction to convert the process result designated in the line 301 into a text message and display the text message in a standard output destination (e.g., the LCD display of the operation panel 18 of the printer 1000 or the browser display of a host computer serving as an application invoking side).

Application installation by the network print server 1500 according to the first embodiment will be explained. FIG. 10 is a flowchart for explaining an application program installation process by the network print server 1500. FIG. 10 illustrates a series of installation processes by the host computer and network print server. Operations definitely separated between the host computer and print server will be explained with reference to FIG. 12.

In step S1001, a WWW application is activated in a client such as a host computer, and the URL of an application installer which runs in the network print server 1500 is input to access the network print server. In step S1002, when the network print server is accessed by the client, the server activates the application installer to display an application installer window shown in FIG. 11 in the client and provide a graphical user interface.

In step S1003, the user is prompted to input an application to be installed (path and file name for specifying an application) and a license code on the application installer window in the client. The license code is provided by the application supplier. If the OK button is clicked, the process advances to step S1004.

If an application and license code are input and the OK button is clicked, the host computer transmits the designated application and license code to the network print server 1500 in step S1004. In step S1005, the network print server 1500 stores the received application in the program storage 1610 of the printer controller 1600 or the program storage 1509 of the network print server 1500. At this time, a model-dependent application (application specialized in the model) is stored in the program storage 1610, and a model-independent application (application common between a plurality of models) is stored in the program storage 1509.

In step S1006, the network print server 1500 stores the license code input to the interface in FIG. 11, in the license storage 1511 in, e.g., a format shown in FIG. 9A. Similarly, in step S1006, the license code is stored in the license storage 1612 of the printer controller 1600 via the expansion interface controller 1602 in, e.g., a format shown in FIG. 9B.

By the above process, the application names and license codes are stored in the license storages 1511 and 1612 in correspondence with each other, as shown in FIGS. 9A and 9B. It is apparent from FIGS. 9A and 9B that license codes for application C do not coincide with each other and application C has been installed in an environment different from the current one.

Figure 12:
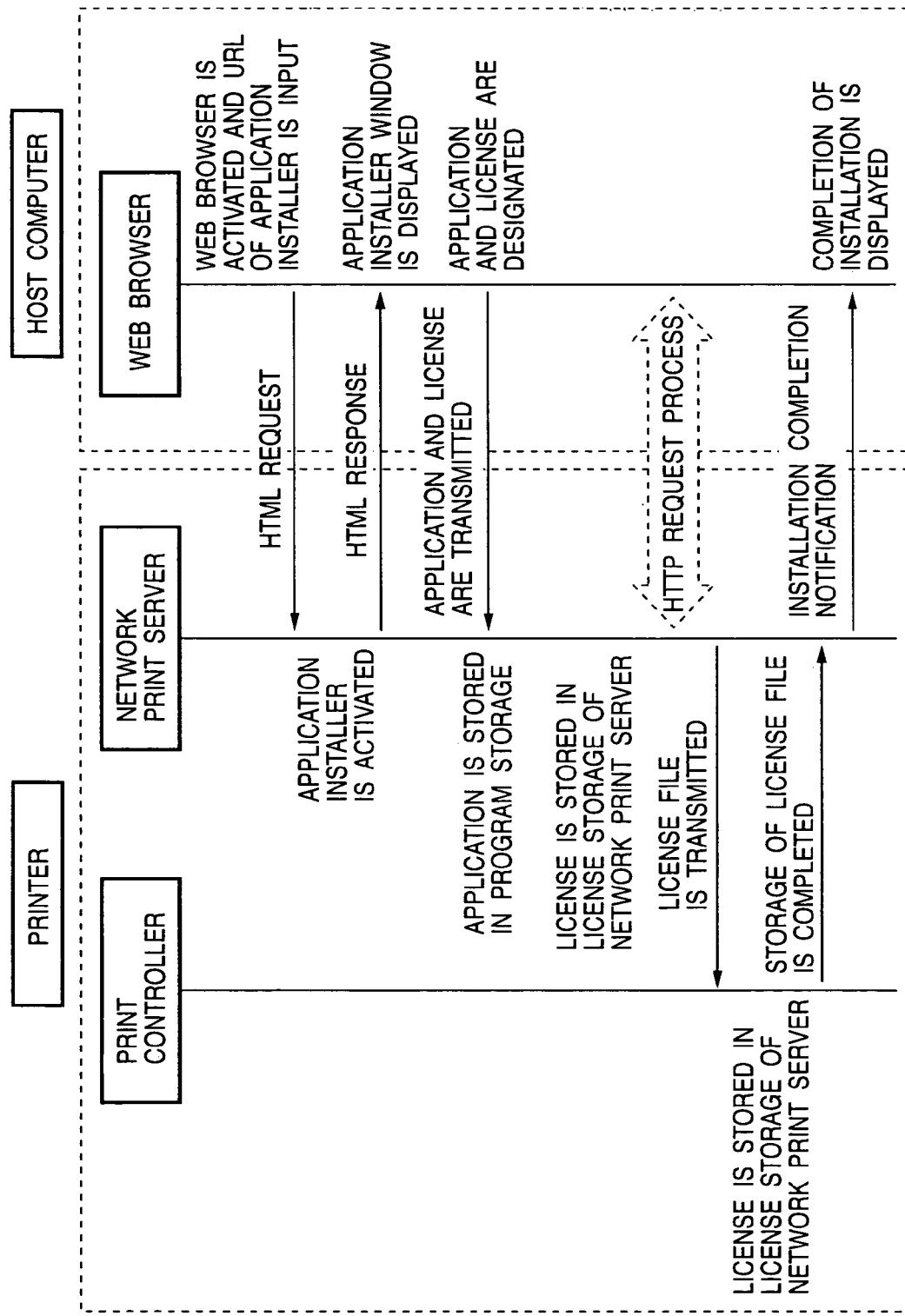
FIG. 12 is a chart for explaining processes between a client and a network print server in the application program installation process according to the first embodiment.

FIG. 12 is a chart showing in detail processes between the print server and the client in the above-described application program installation sequence.

A WWW application is activated in a client such as a host computer, the URL of an application installer which runs in the network print server 1500 is input, and then an HTML request is transmitted to the network print server 1500. Upon reception of the HTML request from the client, the network print server 1500 activates the application installer, and sends back an HTML response to the client. The client displays an application installer window in accordance with the HTML response. An application to be installed and a license code are input in the application installer window displayed on the client, the OK button is clicked, and then the application and license code are transmitted to the network print server 1500.

The network print server 1500 which has received the application and license code stores the application in the program storage 1610 of the print controller 1600 or the program storage 1509 of the network print server 1500. The network print server 1500 stores the received license code in the license storage 1511. At the same time, the network print server 1500 transmits the license code to the print controller 1600 via the expansion interface controller 1602, and causes the printer controller 1600 to store the license code in the license storage 1612. Upon the completion of the data storage process, the network print server 1500 notifies the client of the completion of installation. The WWW application in the client displays the completion of installation in accordance with the completion notification.

FIG. 4 is a flowchart showing an activation process method for an application program which runs in the network print server 1500 according to the first embodiment. This process is included in the management application 1504. S401 to S413 represent process steps, and correspond to a process flow when an application activation request to the printer 1000 is received from an external device such as a host computer connected to the local area network (LAN 2000.). Control procedures corresponding to the steps are stored in the Flash ROM 3 of the network print server 1500.

In step S401, an application activation request instruction is received from an external device (not shown) such as a host computer via the LAN 2000. In the first embodiment, the application activation request instruction specifies by a URL (Uniform Resource Locator) an application program to be activated. In step S402, a URL which specifies the application is acquired from the application activation request instruction received in step S401. In step S403, storage destination information in the printer 1000 for the application whose activation is requested is extracted from the acquired URL. For example, when the URL of the designated application is HTTP://192.168.0.215/abc/xyz.Java HTTP:// represents the scheme, and 192.168.0.215 represents the network address of the printer apparatus itself. Thus, information extracted as storage destination information is "/abc/xyz.Java".

In the first embodiment, whether the application is stored in the storage (e.g., the Flash ROM 3) of the print server 1500 or in the storage (e.g., the ROM 9) of the printer controller 1600 is determined from the character string of the storage destination information. In the first embodiment, a storage destination starting from "/dev/" is the printer controller.

In step S404, whether the character string of the storage destination information extracted in step S403 starts from "/dev/" is determined. If the character string of the storage destination information does not start from "/dev/", the application to be activated is determined to be stored in the network print server 1500, and the process advances to step S408. In step S408, whether the target application program exists in the storage of the network print server 1500 is determined. If the target application program exists, the process advances to step S412, and the license codes of the application that are stored in the license storages 1612 and 1511 are compared to determine whether these license codes coincide with each other. If these license codes do not coincide with each other, the application program is determined not to be a proper one. The process advances to step S411 to notify the host computer serving as the transmitting side of the application activation request instruction of an error, and then ends. If these license codes coincide with each other, the application program is determined to be a proper one. The process advances to step S409 to load the requested application program to the RAM 14 of the network print server 1500. The process advances to step S410 to activate the application program, and then ends. If no target application exists in step S408, the process advances to step S411 to notify the requesting side of an error, and then ends.

If the character string of the storage destination information starts from "/dev/" in step S404, the storage destination of the application whose activation is requested is determined to be the printer controller 1600, and the process advances to step S405. In step S405, an application program acquisition request is issued to the printer controller 1600 by using the API (resource control API) as shown in FIG. 2. In step S406, whether the requested application program has been acquired is determined on the basis of a response from the printer controller 1600. If the requested application program has been acquired, the process advances to step S413, and the license codes of the application that are stored in the license storages 1612 and 1511 are compared to determine whether these license codes coincide with each other. If these license codes do not coincide with each other, the application program is determined not to be a proper one. The process advances to step S411 to notify the host computer serving as the transmitting side of the application activation request instruction of an error, and then ends. If these license codes coincide with each other, the application program is determined to be a proper one. The process advances to step S407 to load the acquired application program to the RAM 14 of the network print server 1500. The process advances to step S410 to activate the application program, and then ends.

If the requested application program is determined in step S406 not to have been acquired from the printer controller 1600, the process advances to step S410 to notify the host computer serving as the transmitting side of the application activation request instruction of an error, and then ends.

For example, when activation of application A is requested in the state shown in FIGS. 9A and 9B, application A is normally activated. When activation of application C is requested, the host computer is notified of an error because of an illicit license code.

As described above, according to the first embodiment, pieces of information (applications) provided on the Java virtual machine are classified into information depending on the model of the printing apparatus and independent information. Model-dependent information is stored in each printing apparatus main body (printer controller), whereas model-independent information is stored in the network card module. This leads to reduction in memory capacity and an increase in use efficiency. In FIG. 4, the network print server 1500 compares license codes, and determines whether they coincide with each other. Alternatively, the printer controller

1600 may acquire license codes, compare and determine them, and notify the network print server 1500 of the determination result.

With the above configuration, a license code input from the host computer or the like in adding an application program is stored in the storage device of the printing apparatus main body and the storage device (e.g., the Flash ROM 3) of the network print server. The license code can determine whether the application program has authentically been stored, and also determine whether the application program module is appropriate for both the printing apparatus and network card module.

Second Embodiment

In the first embodiment, the storage destination of an application is determined from a URL included in an application activation request in accordance with the application activation request from an external device such as a host computer. In the second embodiment, an application designated as an automatic activation application upon activation of a printer 1000 is activated. Information for designating an automatic activation application is stored in advance in a predetermined storage area of a network print server 1500.

FIG. 5 is a flowchart showing an activation process method according to the second embodiment for an application program which runs in the network print server 1500. Steps S501 to S512 represent process steps, and control procedures corresponding to the steps are stored in a Flash ROM 3 of the network print server 1500. This process is also included in a management application 1504.

When the printer 1000 is powered on or reactivated by resetting, whether storage information of an application to be automatically activated exists in a predetermined storage area of the network print server 1500 is determined in step S501. If storage information of the application to be automatically activated exists, the process advances to step S502 to acquire storage information of the application to be activated. The storage information contains a path (storage destination) and application file name. In step S503, whether a character string representing the storage destination of the application starts from "/dev/" is determined.

If the character string representing the storage destination does not start from "/dev/", the storage destination of the application is determined to be the network print server 1500, and the process advances to step S507. In step S507, whether the target application program exists in the storage of the network print server is determined. If the target application program exists, the process advances to step S511, and the license codes of the application that are stored in license storages 1612 and 1511 are compared to determine whether these license codes coincide with each other. If these license codes do not coincide with each other, the application program is determined not to be a proper one, and the process ends. If these license codes coincide with each other, the application program is determined to be a proper one. The process advances to step S508 to load the target printing apparatus to a RAM 14 of the network print server 1500. The process advances to step S509 to activate the application program, and then ends. If the requested application is determined in step S507 not to exist, the process ends.

If the character string representing the storage destination starts from "/dev/" in step S503, the storage destination of the application whose activation is requested is determined to be a printer controller 1600, and the process advances to step S504. In step S504, an application program acquisition request is issued to the printer controller 1600 by using the API (resource control API) as shown in FIG. 2. In step S505, whether the requested application program has been acquired is determined on the basis of a response from the printer controller 1600. If the requested application program is determined to have been acquired, the process advances to step S512, and the license codes of the application that are stored in the license storages 1612 and 1511 are compared to determine whether these license codes coincide with each other. If these license codes do not coincide with each other, the application program is determined not to be a proper one, and the process ends. If these license codes coincide with each other, the application program is determined to be a proper one. The process advances to step S506 to load the application program to the RAM 14 of the network print server 1500. The process advances to step S509 to activate the application program, and then ends.

If the requested application program is determined in step S505 not to have been acquired from the printer controller 1600, the process ends immediately.

Also when storage information of an application to be automatically activated is determined in step S501 not to exist, the process ends immediately.

As described above, the second embodiment can cope with automatic activation of an application while maintaining the same effects as those of the first embodiment.

Third Embodiment

The first and second embodiments have explained the application activation process. The third embodiment will describe an execution process for various commands during execution of an application. In the third embodiment, a plurality of types of command process functions can be distributed and held in a network print server and printer controller, thereby increasing the memory use efficiency.

FIG. 6 is a flowchart showing a process sequence for an instruction described in an application program which runs in a network print server 1500 according to the third embodiment. S601 to S610 represent process steps. Control procedures corresponding to the steps are stored in a Flash ROM 3 of the network print server 1500.

When an application program is activated in accordance with the flow shown in FIG. 4 or 5, one of instructions contained in a running application program is extracted and analyzed in step S601. If the instruction type is determined in step S602 to be an instruction which depends on a printer controller 1600 and must be processed via the printer controller, like the data transfer API as shown in FIG. 3, the process advances to step S603. In step S603, the instruction code is converted in accordance with the instruction format of the printer controller 1600 as shown in FIG. 7. In step S604, the converted instruction code is transmitted to the printer controller 1600 via an expansion interface 17. For example, for the data transfer API "printer.outdata("Test")" shown in FIG. 3, a value (0) representing "write" is set in the instruction type in FIG. 7. An instruction number (e.g., 700) designating printing is set in the call function number area. A value (1) representing that the data type of data "test" to be printed is character string data is set in the argument data type area. The data size (e.g., 4321) of "test" is set in the argument data size area. An instruction code which stores actual data of "test" is set in the argument data area. The resultant instruction code is transferred to the printer controller 1600.

In step S605, whether a response to transmission of the instruction code has been received from the printer controller 1600 is determined. If the response has been received, the process advances to step S606. In step S606, the process result sent back from the printer controller 1600 is received. The process result sent back from the printer controller 1600 has a format as shown in FIG. 8. For example, for the data transfer API "printer.outdata("Test")", a value representing the process result of the instruction code transmitted in step S604 is stored in the function return value area. A value (0) representing that the data type contained in the response data area is a numeric is stored in the response data type area. A numerical value representing the number of bytes as the data size of the response data area is stored in the response data size area. Response data of the instruction number designated in step S604 is stored in the response data area. After that, the process result is sent back. In step S607, the process result is converted into a process result format corresponding to the original program instruction. The process then advances to step S609. If no response to the transmitted instruction code can be received from the printer controller 1600 within a predetermined period in step S605, the program process ends immediately.

If the instruction is determined in step S602 not to depend on the printer controller 1600, the process advances to step S608 to process the program instruction by the network print server 1500, and then the process advances to step S609.

In step S609, the process result of the program instruction is stored in a predetermined memory space of the network print server 1500. In step S610, whether a subsequent program instruction exists is determined. If the next instruction exists, the process returns to step S601 again to repeat the above process. If no next instruction exists, the process ends.

As described above, according to the third embodiment, even when a program instruction contained in a running application program is a printer controller-dependent instruction, this instruction can be provided to the printer controller and executed. In other words, since the network print server 1500 need not hold any model-dependent instruction execution function, reduction in memory capacity and efficient use are promoted.

Fourth Embodiment

In the first embodiment, the appropriateness of an application is determined using a license code input in installation as an authentication code. In the fourth embodiment, an equipment information code representing the equipment state of the apparatus is added to a license code and used as an authentication code. This can prevent erroneous activation of an application which cannot be used upon a change in equipment state even in the same apparatus or same model.

Installation of an application program according to the fourth embodiment will be explained. FIG. 16 is a flowchart for explaining an application program installation process by a network print server 1500 according to the fourth embodiment. FIG. 16 illustrates a series of installation processes by a host computer and network print server. Operations definitely separated for detailed processes between the host computer and the print server are the same as those shown in FIG. 12.

In step S1501, a WWW application is activated in a client such as a host computer, and the URL of an application installer which runs in the network print server 1500 is input to access the network print server. In step S1502, when the network print server is accessed by the client, the server activates the application installer to display an application installer window shown in FIG. 11 in the client.

In step S1503, the user is prompted to input an application to be installed (path and file name for specifying an application) and a license code on the application installer window in the client. The license code is provided by the application supplier. If the OK button is clicked, the process advances to step S1502.

If an application and license code are input and the OK button is clicked, the host computer transmits the designated application and license code to the network print server 1500 in step S1504. In step S1505, the network print server 1500 stores the received application in a program storage 1610 of a printer controller 1600 or a program storage 1509 of the network print server 1500. At this time, a model-dependent application (application specialized in the model) is stored in the program storage 1610, and a model-independent application (application common between a plurality of models) is stored in the program storage 1509.

Figure 17A:
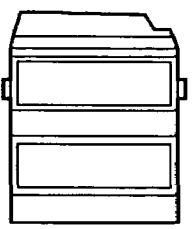
FIGS. 17A, 17B, and 17C are views showing examples of an authentication code according to the fourth embodiment.
Figure 17B:
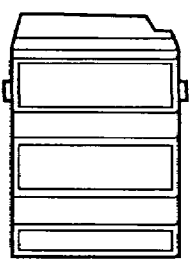
Figure 17C:
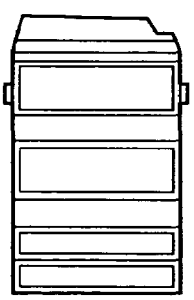

In step S1506, the network print server 1500 reads out equipment information of a printer 1000 via the printer control logical I/F of an expansion interface controller 1602 of the printer controller 1600. In step S1507, the equipment information read out in step S1506 is converted into a code, and the code is added to the input license code to generate an authentication code. FIGS. 17A to 17C are views showing examples of the generated authentication code. FIGS. 17A to 17C represent the difference in authentication code depending on the difference in the number of paper cassettes which store print sheets.

The first code "49560034" of the authentication code in FIG. 17A is a license code input from the user interface shown in FIG. 11 in installing an application. A code subsequent to "–" represents the number of paper cassettes, the presence/absence of a double-sided printing function, and the presence/absence of an external memory 10 (HDD (Hard Disk Drive)) connected via a disk controller (DKC). FIG. 17A shows a case in which no additional paper cassette exists, the double-sided printing function is provided, and the HDD is connected. FIG. 17B shows a case in which one paper cassette is added to the equipment state of FIG. 17A. FIG. 17C shows a case in which two paper cassettes are added to the equipment state of FIG. 17A.

In step S1508, the authentication code generated in step S1507 is stored in a license storage 1511 of the network print server 1500 in, e.g., a format shown in FIG. 15A. In step S1508, the authentication code is transferred to the printer controller 1600 via the expansion interface controller 1602, and stored in a license storage 1612 in, e.g., a format shown in FIG. 15B.

By the above process, the application names and authentication codes are stored in the license storages 1511 and 1612 in correspondence with each other, as shown in FIGS. 15A and 15B.

Figure 13:
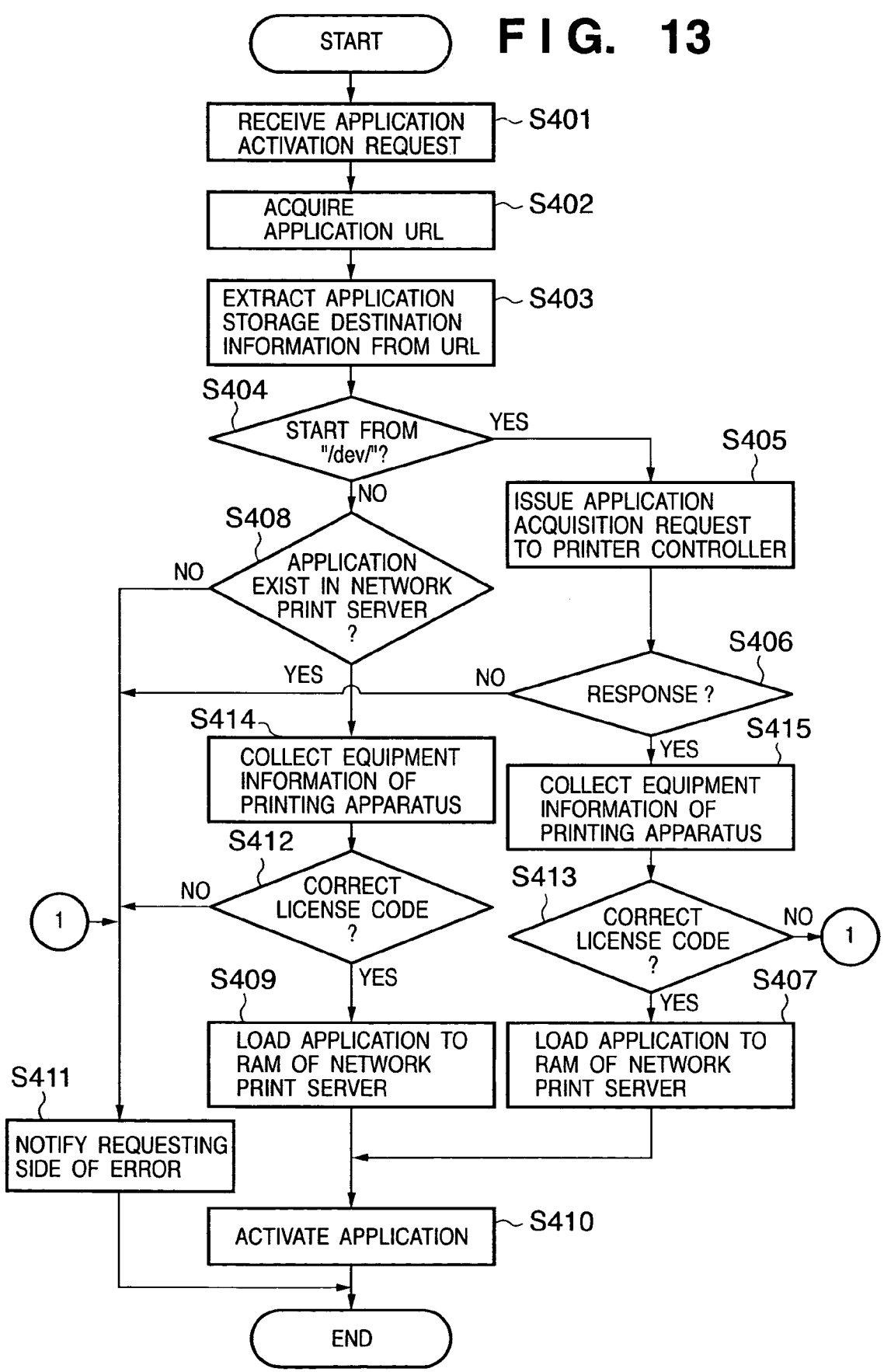
FIG. 13 is a flowchart showing an application program activation process method according to the fourth embodiment.

FIG. 13 is a flowchart showing an activation process method for an application program which runs in the network print server 1500 according to the fourth embodiment. In FIG. 13, the same step numbers as those in the first embodiment (FIG. 4) denote the same processes.

As described in the first embodiment, if storage destination information extracted in step S403 is determined not to start from "/dev/", the process advances to step S408. In step S408, whether the target application program exists in the storage of the network print server 1500 is determined. If the target application program exists, the process advances to step S414. In step S414, the network print server 1500 reads out equipment information of the printer 1000 via the printer control logical I/F of the expansion interface controller 1602 of the printer controller 1600. In step S412, the authentication codes of the application that are stored in the license storages 1511 and 1612 are compared to determine whether these authentication codes coincide with each other and equipment information of the printer 1000 that is acquired in step S414 and the equipment information code of the authentication code coincide with each other. If these codes do not coincide with each other, the application program is determined not to be a proper one. The process advances to step S411 to notify the host computer serving as the transmitting side of the application activation request instruction of an error, and then ends. If these codes coincide with each other, the application program is determined to be a proper one. The process advances to step S409 to load the requested application program to the RAM 14 of the network print server 1500. The process advances to step S410 to activate the application program, and then ends.

If the character string of the storage destination information starts from "/dev/" in step S404, the process advances to step S405 to issue an application program acquisition request to the printer controller 1600 by using the API as shown in FIG. 2. In step S406, whether the requested application program has been acquired is determined on the basis of a response from the printer controller 1600. If the requested application program has been acquired, the process advances to step S415. In step S415, the network print server 1500 reads out equipment information of the printer 1000 via the printer control logical I/F of the expansion interface controller 1602 of the printer controller 1600. In step S413, the authentication codes of the application that are stored in the license storages 1511 and 1612 are compared to determine whether these authentication codes coincide with each other and equipment information of the printer 1000 that is acquired in step S415 and the equipment information code of the authentication code coincide with each other. If these codes do not coincide with each other, the application program is determined not to be a proper one. The process advances to step S411 to notify the host computer serving as the transmitting side of the application activation request instruction of an error, and then ends. If these codes coincide with each other, the application program is determined to be a proper one. The process advances to step S407 to load the acquired application program to the RAM 14 of the network print server 1500. The process advances to step S410 to activate the application program, and then ends.

As described above, according to the fourth embodiment, pieces of equipment information of the printer 1000 upon installation and activation of an application are compared with each other, in addition to authentication operation of the first embodiment. This can prevent erroneous activation of an application which cannot be used upon a change in equipment state even in the same apparatus.

Fifth Embodiment

The fifth embodiment will explain an example in which the application activation process described in the fourth embodiment is applied to the automatic application activation process described in the second embodiment.

Figure 14:
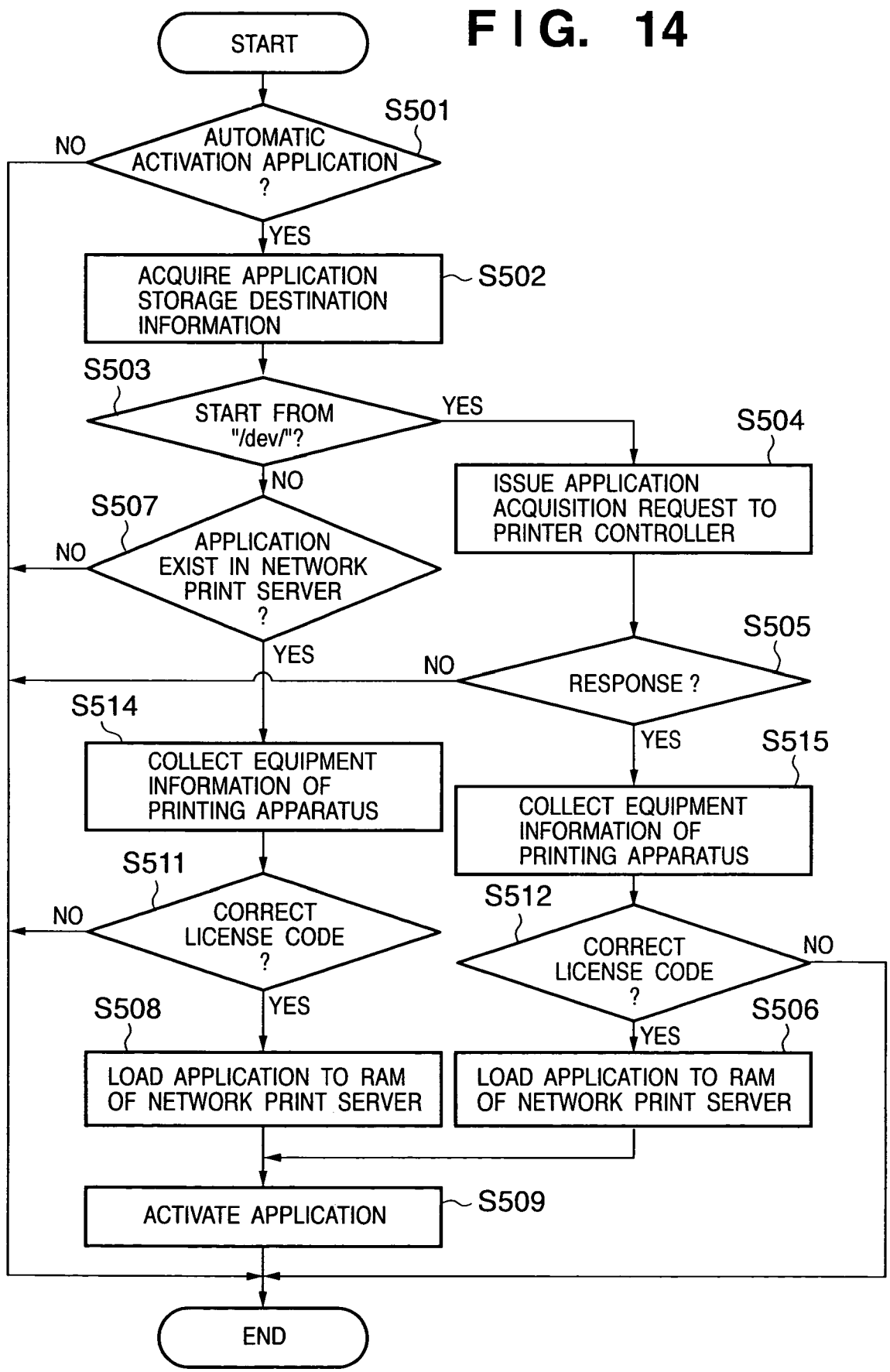
FIG. 14 is a flowchart showing an application program activation process method according to the fifth embodiment.

FIG. 14 is a flowchart showing an activation process method for an application program which runs in a network print server 1500 according to the fifth embodiment. In FIG. 14, the same step numbers as those in the second embodiment (FIG. 5) denote the same processes.

If the storage destination of an application whose activation is requested is determined to be a printer controller, an application acquisition request is issued to a printer controller 1600 in step S504. If the requested application is acquired from the printer controller 1600, the process advances from step S505 to step S515. In step S515, the network print server 1500 reads out equipment information of a printer 1000 via the printer control logical I/F of an expansion interface controller 1602 of the printer controller 1600. In step S512, the authentication codes of the application that are stored in license storages 1511 and 1612 are compared to determine whether these authentication codes coincide with each other and equipment information of the printer 1000 that is acquired in step S515 and the equipment information code of the authentication code coincide with each other. If these codes do not coincide with each other, the application program is determined not to be a proper one, and the process ends. If these codes coincide with each other, the application program is determined to be a proper one. The process advances to step S506 to load the acquired application program to a RAM 14 of the network print server 1500. The process advances to step S509 to activate the application program, and then ends.

If the storage destination of an application whose activation is requested is determined to be the network print server, and the requested application is acquired, the process advances from step S507 to step S514. In step S514, the network print server 1500 reads out equipment information of the printer 1000 via the printer control logical I/F of the expansion interface controller 1602 of the printer controller 1600. In step S511, the authentication codes of the application that are stored in the license storages 1511 and 1612 are compared to determine whether these authentication codes coincide with each other and equipment information of the printer 1000 that is acquired in step S514 and the equipment information code of the authentication code coincide with each other. If these codes do not coincide with each other, the application program is determined not to be a proper one, and the process ends. If these codes coincide with each other, the application program is determined to be a proper one. The process advances to step S508 to load the acquired application program to the RAM 14 of the network print server 1500. The process advances to step S509 to activate the application program, and then ends.

As described above, according to the first to fifth embodiments, activation of an application program which a specific data processing apparatus is permitted to use or an application program depending on a specific data processing apparatus is limited in a network apparatus detachable from a data processing apparatus. Unlimited use of an application and activation of an application which does not match the apparatus can be prevented.

Sixth Embodiment

Figure 18:
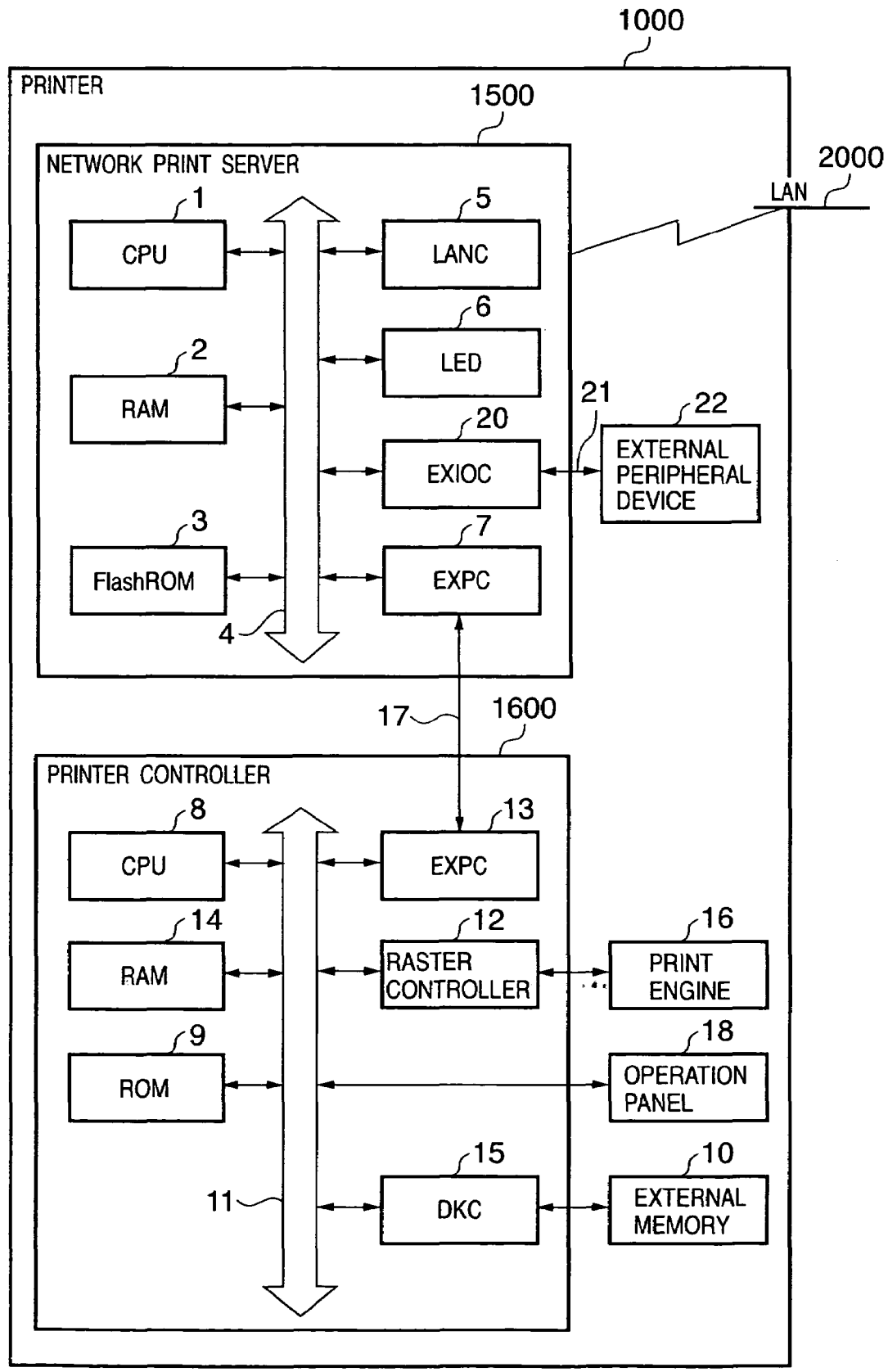
FIG. 18 is a block diagram showing the hardware configuration of a printing system according to the sixth embodiment.

FIG. 18 is a block diagram for explaining the hardware configuration of a printing system according to the sixth embodiment. The printing system has almost the same configuration as that in the first embodiment (FIG. 1) except that an external peripheral device interface controller (EXIOC 20) is added. The external peripheral device interface controller (EXIOC 20) is an external peripheral device interface mounted in a network print server 1500, and is different from an expansion interface controller 7 and expansion interface 17 which are connected to a printer 1000 (to be described later). Although the form of the external peripheral device interface is not particularly referred to in the sixth embodiment, examples of this interface are a USB interface and IEEE1394 interface. The network print server 1500 can communicate with an external peripheral device 22 connected via the external peripheral device interface. Further, the network print server 1500 can control the external peripheral device 22.

Figure 19:
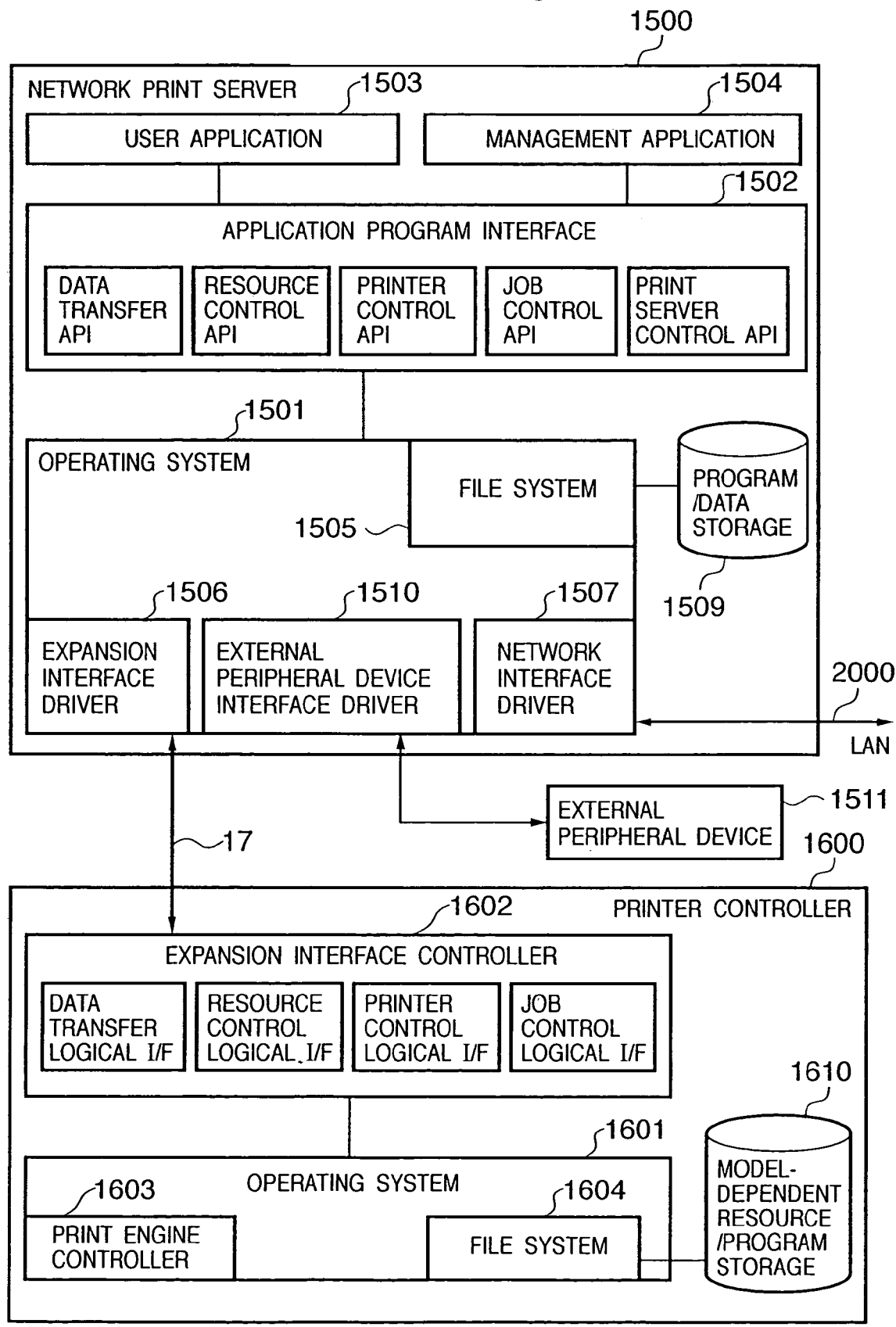
FIG. 19 is a block diagram showing the software configuration of the printing system according to the sixth embodiment.

FIG. 19 is a block diagram for explaining the software configurations of control programs which are stored in the storages of the network print server 1500 and a printer controller 1600 shown in FIG. 18. The configurations are almost the same as those in the first embodiment (FIG. 2). The network print server 1500 further incorporates an external peripheral device interface driver 1510 which controls communication with an external peripheral device 1511 via an external peripheral device interface (EXIO 21). A program/data storage 1509 is formed from, e.g., a Flash ROM 3.

An example of the description of an application program which runs in the network print server 1500 is shown in FIG. 3.

Figure 20:
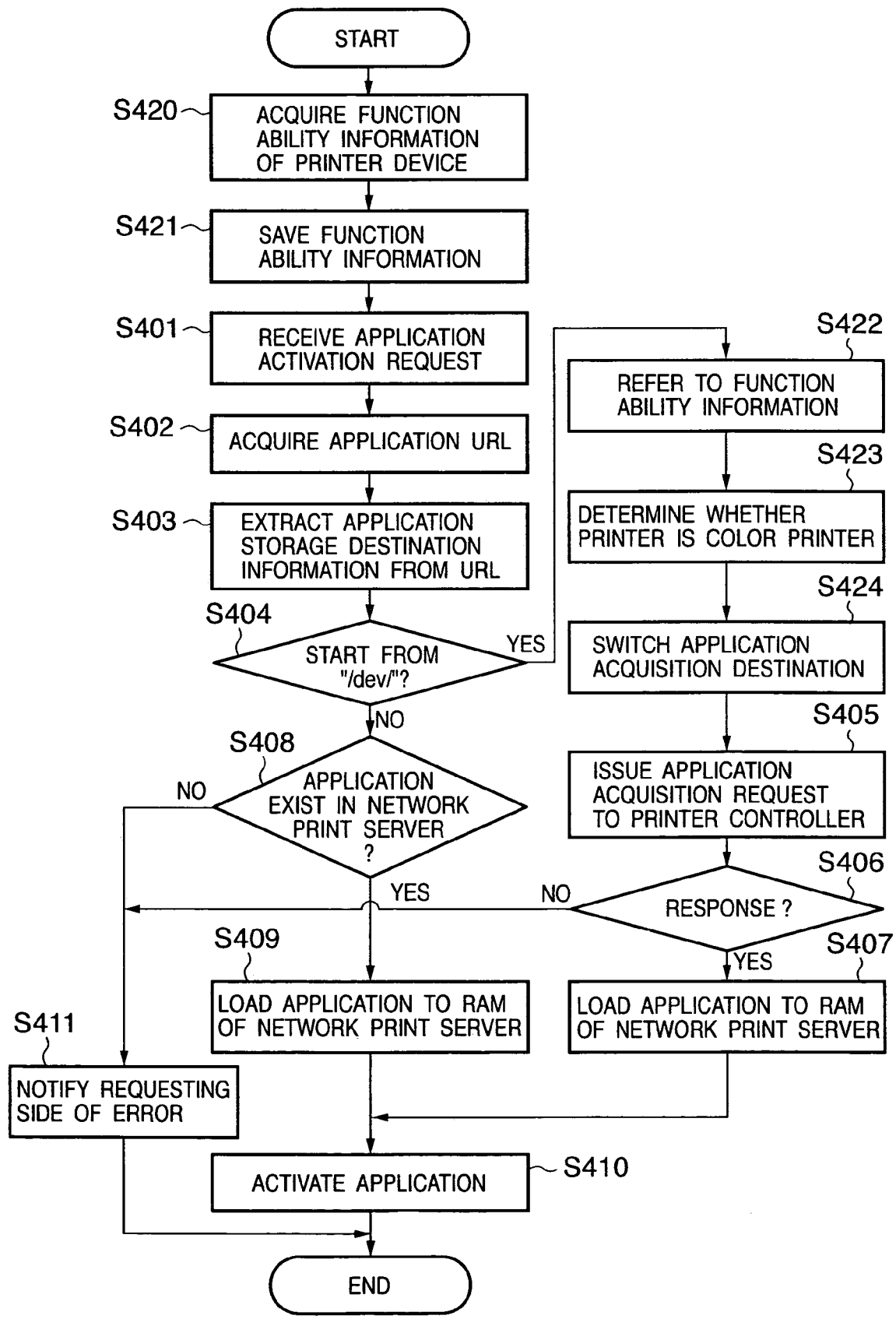
FIG. 20 is a flowchart showing an application program activation process method according to the sixth embodiment.

FIG. 20 is a flowchart showing an activation process method for an application program which runs in the network print server 1500 according to the sixth embodiment. This process is included in a management application 1504. S401 to S411 and S420 to S424 represent process steps, and correspond to a process flow when an application activation request to the printer 1000 is received from an external device such as a host computer connected to a local area network (LAN 2000). Control procedures corresponding to the steps are stored in the Flash ROM 3 of the network print server 1500. The same step numbers as those shown in FIG. 4 denote the same processes.

In the following operation example, application program acquisition process operation is switched in accordance with the color parameter in executing an application. In step S420, a network card module serving as the network print server 1500 acquires function ability information of the connected printer 1000. In step S421, the function ability information acquired in step S420 is saved in the memory so as to be able to refer to it later from an application program.

As described in the first embodiment (FIG. 4), when an application activation request instruction is received in steps S401 to S403, a URL which specifies an application is acquired from the received application activation request instruction. Storage destination information in the printer 1000 for the application whose activation is requested is extracted from the acquired URL. Also in the sixth embodiment, a storage destination starting from "/dev/" is the printer controller.

In step S404, whether the character string of the storage destination information extracted in step S403 starts from "/dev/" is determined. If the character string of the storage destination information does not start from "/dev/", the application to be activated is determined to be stored in the network print server 1500, and the process advances to step S408. In step S408, whether the target application program exists in the storage of the network print server 1500 is determined. If the target application program exists, the process advances to step S409 to load the requested application program to a RAM 14 of the network print server 1500. The process advances to S410 to activate the application program, and then ends. If no target application exists in step S408, the process advances to step S411 to notify the requesting side of an error, and then ends.

If the character string of the storage destination information starts from "/dev/" in step S404, the storage destination of the application whose activation is requested is determined to be the printer controller 1600, and the process advances to step S422. Function ability information of the printer 1000 is referred to in step S422, and whether one of function abilities corresponds to color printing is determined in step S423. In step S424, acquisition of the application program is switched in accordance with whether the connected printer 1000 is a color printer or monochrome printer. More specifically, in order to switch a running application, information of the application storage destination (acquisition destination) is converted. Assume that storage destination information is expressed as /dev/$COLOR_FUNC/calibration.java. In this case, $COLOR_FUNC is interpolated on the basis of the function information. The storage destination information is converted into /dev/color/calibration.java for a color printer and /dev/mono/calibration.java for a monochrome printer. With this operation, the application acquisition destination is switched. In the sixth embodiment, an application to be activated is decided in accordance with whether the printer 1000 is a color printer. Decision of an application can also be controlled in accordance with another function ability (e.g., resolution).

In step S405, an acquisition request for the application program set in step S424 is issued to the printer controller 1600 by using an API (resource control API) as shown in FIG. 19. In step S406, whether the requested application program has been acquired is determined on the basis of a response from the printer controller 1600. If the requested application program has been acquired, the process advances to step S407 to load the acquired application program to the RAM 14 of the network print server 1500. The process advances to step S410 to activate the application program, and then ends.

If the requested application program is determined in step S406 not to have been acquired from the printer controller 1600, or the requested application is determined in step S408 not to exist in the network print server, the process advances to step S411 to notify the host computer serving as the transmitting side of the application activation request instruction of an error, and then ends. If a subsequent application activation request exists, the process is repeated from step S401.

As described above, according to the sixth embodiment, pieces of information (applications) provided on the Java virtual machine are classified into information depending on the model of the printing apparatus and independent information. Model-dependent information is stored in each printing apparatus main body (printer controller), whereas model-independent information is stored in the network card module. As a result, the memory capacity can be reduced, and the use efficiency can be increased. Also, the application can be automatically switched in accordance with the printer function to execute an appropriate application.

Seventh Embodiment

In the sixth embodiment, the storage destination of an application is determined from a URL in accordance with an application activation request from an external device such as a host computer. In the seventh embodiment, an application designated as an automatic activation application upon activation of a printer 1000 is activated. Information for designating an automatic activation application is stored in advance in a predetermined storage area of a network print server 1500.

Figure 21:
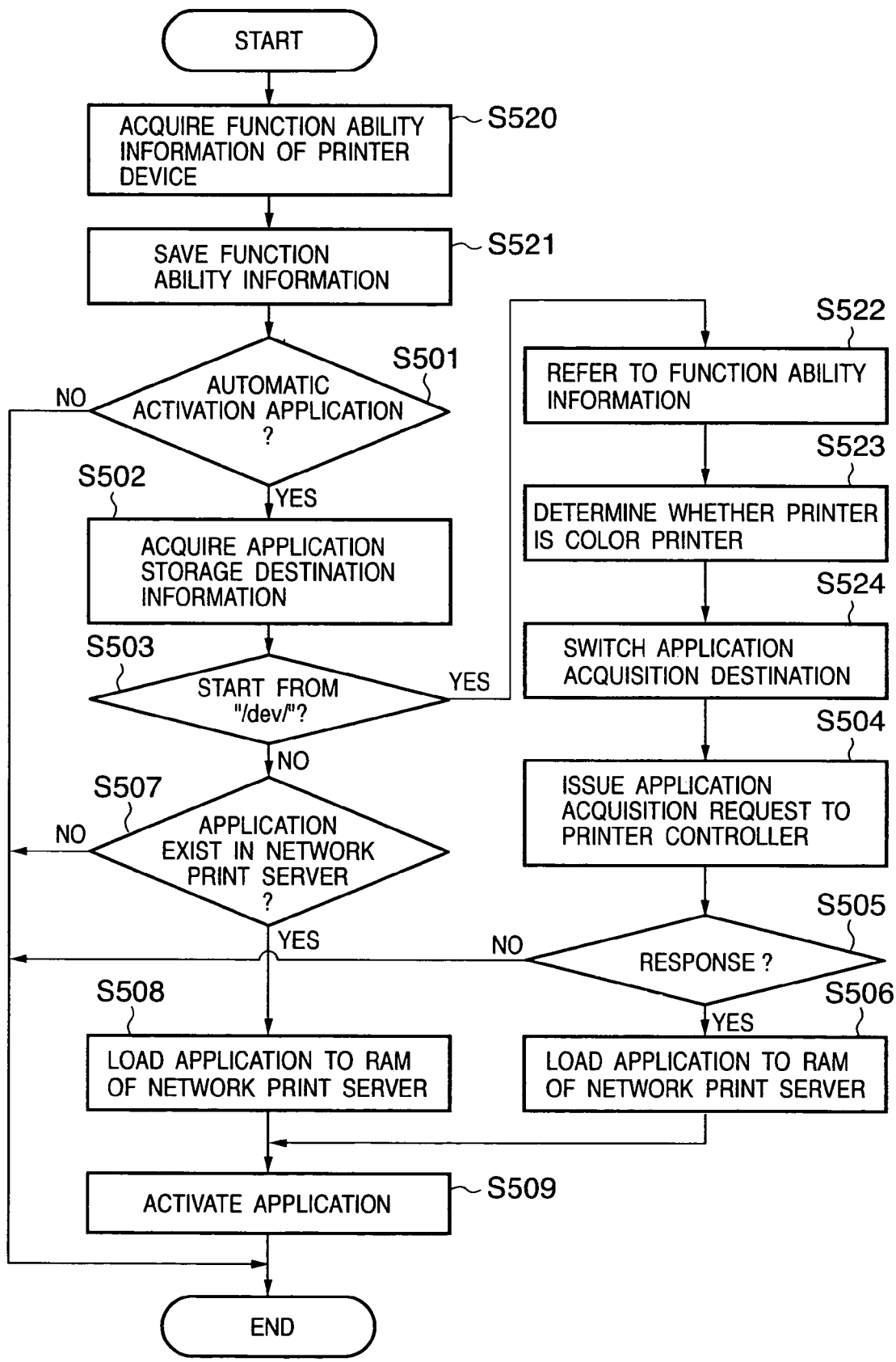
FIG. 21 is a flowchart showing an application program activation process method according to the seventh embodiment.

FIG. 21 is a flowchart showing an activation process method according to the seventh embodiment for an application program which runs in the network print server 1500. Steps S501 to S509 and S520 to S524 represent process steps, and control procedures corresponding to the steps are stored in a Flash ROM 3 of the network print server 1500. The same step numbers as those in the second embodiment (FIG. 5) denote the same processes. This process is also included in a management application 1504. In the following description, when an application present in the network print server 1500 do not comply with the function ability of the printer 1000, the network print server 1500 acquires an application complying with the function ability of the printer 1000 from the printer 1000, and activates the acquired application instead of the automatic activation application. The color parameter is adopted as a function example of the printer 1000. In executing an application, application program acquisition process operation is switched in accordance with the color parameter.

When the printer 1000 is powered on or reactivated by resetting, a network card module serving as the network print server 1500 acquires function ability information of the connected printer 1000 in step S520. In step S521, the function ability information acquired in step S520 is saved in the memory so as to be able to refer to it later from an application program. In step S501, whether storage information of an application to be automatically activated exists in a predetermined storage area of the network print server 1500 is determined. If storage information of the application to be automatically activated exists, the process advances to step S502 to acquire storage information of the application to be activated. The storage information contains a path (storage destination) and application file name. In step S503, whether a character string representing the storage destination of the application starts from "/dev/" is determined.

If the character string representing the storage destination does not start from "/dev/", the storage destination of the application is determined to be the print server 1500, and the process advances to step S507. In step S507, whether the target application program exists in the storage of the network print server is determined. If the target application program exists, the process advances to step S508 to load the target application program to a RAM 14 of the network print server 1500.

If the character string representing the storage destination starts from "/dev/" in step S503, the storage destination of the application whose activation is requested is determined to be a printer controller 1600, and the process advances to step S522. Function ability information of the printer 1000 is referred to in step S522, and whether the application whose activation is requested copes with the printer 1000 is determined in step S523. If the application does not cope with the printer 1000, the acquisition destination of the application program is switched in step S524. More specifically, when the application copes with a monochrome printer and the printer 1000 is a color printer, information of the application storage destination (acquisition destination) is converted. Assume that storage destination information is expressed as /server/mono/calibration.java. In this case, /server/mono is interpolated on the basis of the function ability information. For example, the storage destination information is converted into /dev/color/calibration.java for a color printer. With this operation, when the application whose activation is requested does not comply with the printer 1000, the application acquisition destination is switched, and an application which complies with the printer 1000 is acquired from the printer 1000. When the application copes with the printer 1000, the flow advances to step S506.

In step S504, an application program acquisition request is issued to the printer controller 1600 by using the API (resource control API) as shown in FIG. 19. In step S505, whether the requested application program has been acquired is determined on the basis of a response from the printer controller 1600. If the requested application program is determined to have been acquired, the process advances to step S506 to load the application program to the RAM 14 of the network print server 1500. The process advances to step S509 to activate the application program, and then ends.

If the requested application program is determined in step S505 not to have been acquired from the printer controller 1600, or the requested application is determined in step S507 not to exist in the network print server, the process ends immediately.

Also when storage information of an application to be automatically activated is determined in step S501 not to exist, the process ends immediately.

As described above, the seventh embodiment can cope with automatic activation of an application while maintaining the same effects as those of the sixth embodiment. In particular, when an application whose activation is requested does not comply with the printer 1000, an application complying with the printer 1000 can be acquired and activated.

Eighth Embodiment

The sixth and seventh embodiments have explained the application activation process. The eighth embodiment will describe an execution process for various commands during execution of an application. In the eighth embodiment, a plurality of types of command process functions can be distributed and held in a network print server and printer controller, thereby increasing the memory use efficiency.

Figure 22:
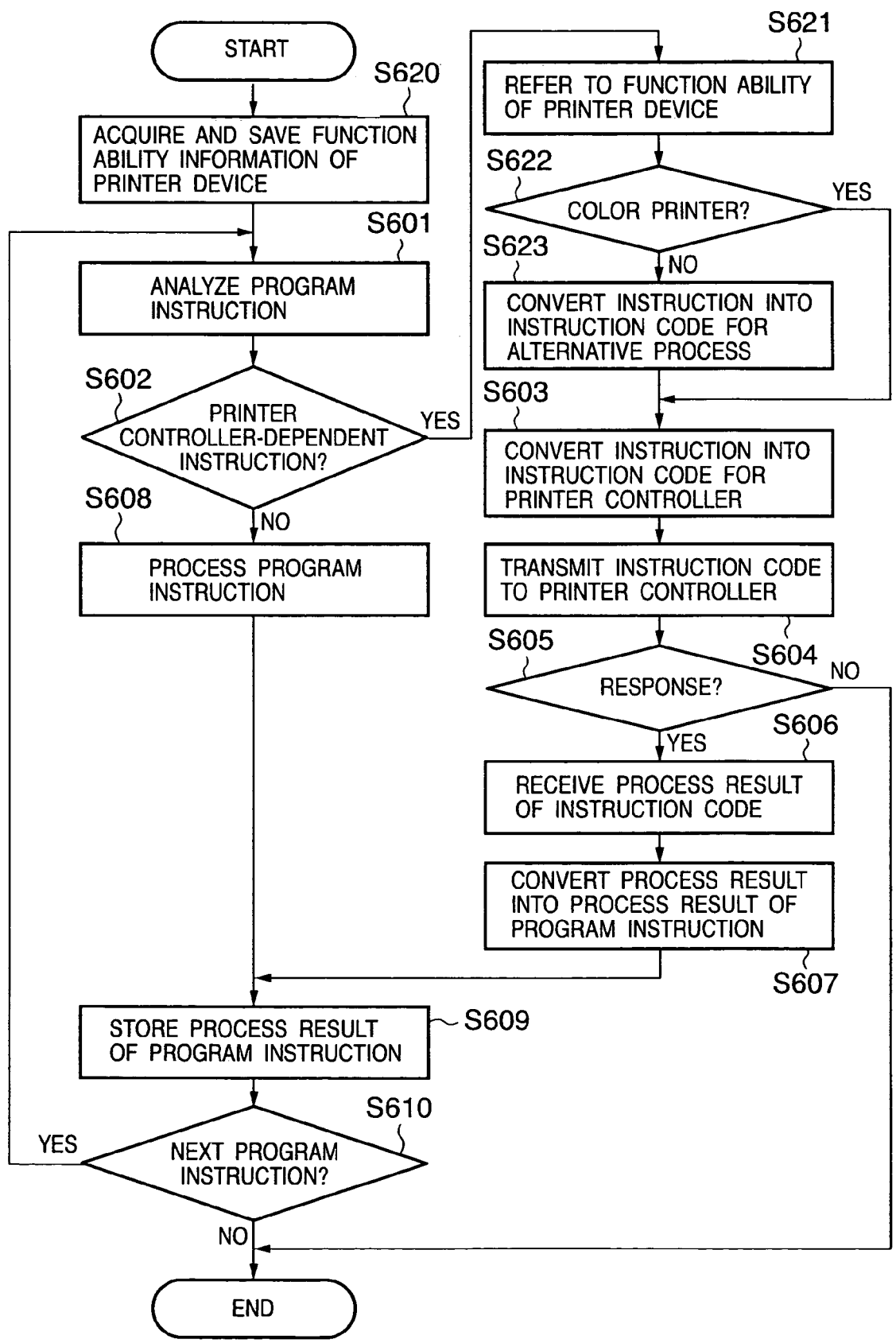
FIG. 22 is a flowchart showing a process method for an instruction described in an application program according to the eighth embodiment.

FIG. 22 is a flowchart showing a process sequence for an instruction described in an application program which runs in a network print server 1500 according to the eighth embodiment. S601 to S610 and S620 to S623 represent process steps. Control procedures corresponding to the steps are stored in a Flash ROM 3 of the network print server 1500. The same step numbers as those in the third embodiment (FIG. 6) denote the same processes.

When an application program is activated in accordance with the flow shown in FIG. 20 or 21, function ability information of a printer is acquired in step S620, and the acquired function ability information is saved in the storage area of the network print server so as to be able to refer to it from a subsequent program. The eighth embodiment will exemplify a case in which the printer is a color printer or monochrome printer.

In step S601, one of instructions contained in a running application program is extracted and analyzed. If the instruction type is determined in step S602 to be an instruction depending on a printer controller 1600, the process advances to step S621 to refer to the function ability information acquired in step S620. If a mounted printer 1000 is a monochrome printer and the instruction is dedicated to a color printer, the instruction cannot be executed. Thus, the process advances from step S622 to step S623 to covert the instruction code, i.e., covert the program instruction so as to be able to execute it even by the monochrome printer.

When the instruction is a calibration function (printer.color_calibration( )) for a color printer, as shown in FIG. 23A, and the connected printer is a monochrome printer, the calibration function is converted into a calibration function (printer.mono_calibration( )) for a monochrome printer, as shown in FIG. 23B. This process assumes that the function called after conversion of the instruction has already been loaded as an application on the main body side. If the function is determined not to have been loaded after conversion, the function may be loaded at this time.

After the process in step S623 ends in this manner, the process advances to step S603. When the color function is confirmed as the function ability, the process directly advances from step S622 to step S603.

Processes in steps S603 to S610 are the same as those in the third embodiment (FIG. 6), and a description thereof will be omitted.

As described above, according to the eighth embodiment, even when a program instruction contained in a running application program is a printer controller-dependent instruction, this instruction can be provided to the printer controller and executed. In other words, since the network print server 1500 need not hold any model-dependent instruction execution function, reduction in memory capacity and efficient use are promoted.

In the sixth to eighth embodiments, acquisition and activation of an application program are controlled on the basis of determination of whether the function ability exhibits a color printer. However, the present invention is not limited to this, and can also be applied to a function ability representing whether the printer has a resolution of 1,200 dpi or an optional emulation.

The sixth to eighth embodiments concern registration operation control of acquiring and activating an application program. This control can also be modified so that a registered application is deleted or updated on the basis of determination of the function ability. These modifications will be described in the ninth and 10th embodiments.

Ninth Embodiment

Figure 24:
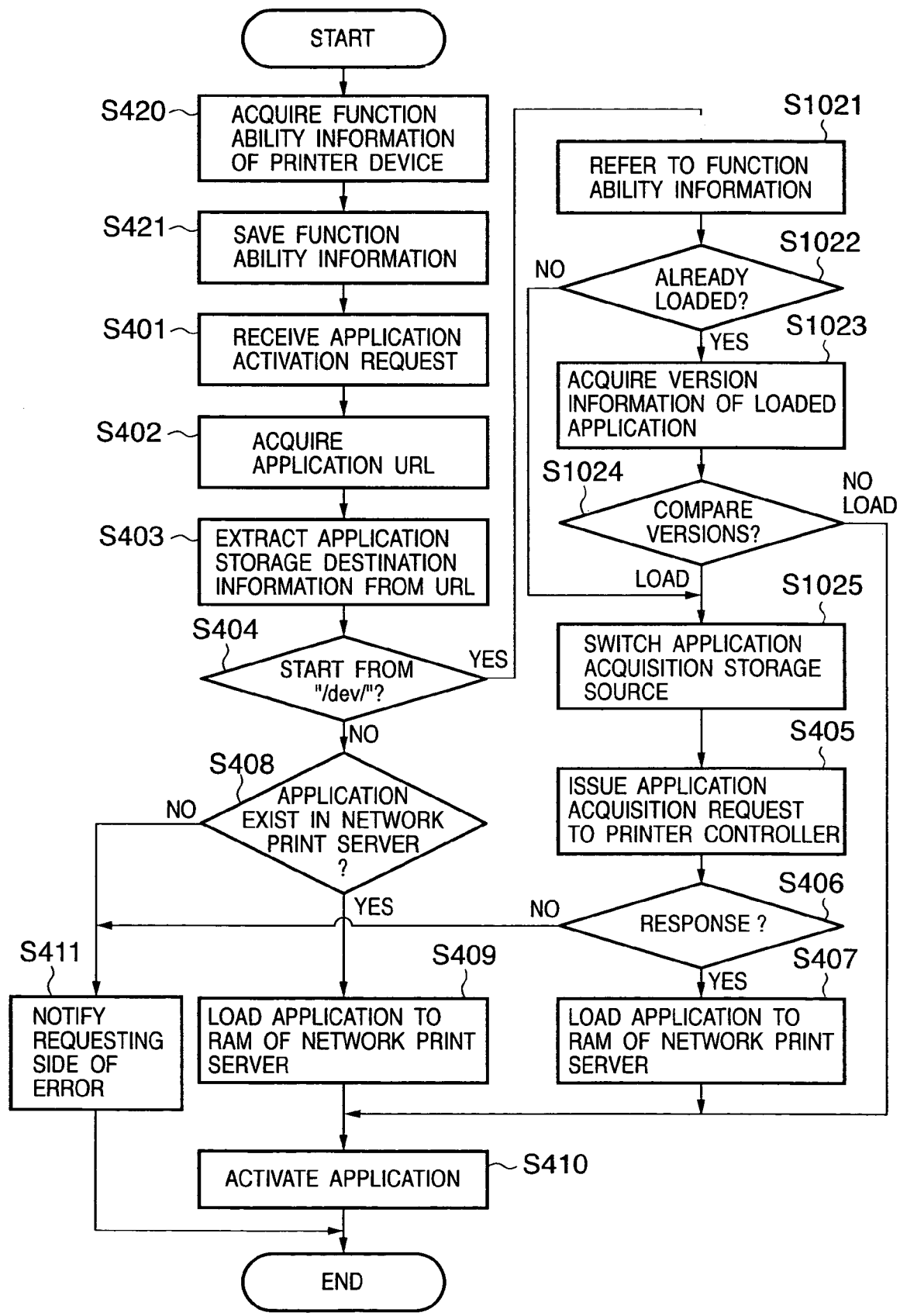
FIG. 24 is a flowchart showing an application program activation process method according to the ninth embodiment.

FIG. 24 is a flowchart for explaining an automatic update process for an application program according to the ninth embodiment. The ninth embodiment will describe an example of a process method in which the present invention is applied when a network card module is moved. The color parameter is adopted as a function example of a printer 1000. Whether to perform update process operation for an application program which has already been activated (registered) is determined by comparing version information. A control program for causing a CPU 1 of a network print server 1500 to execute process steps in FIG. 24 is stored in a Flash ROM 3 of the network print server 1500. Steps S401 to S411, S420, and S421 are the same as those in the sixth embodiment (FIG. 20).

If the character string of storage destination information starts from "/dev/" in step S404, the storage destination of an application whose activation is requested is determined to be a printer controller 1600, and the process advances to step S1021. In step S1021, function ability information which has been acquired and saved in steps S420 and S421 is referred to. In this case, whether the function ability of the printer 1000 represents color printing is determined. The acquisition destination and version information of the application program to be loaded are acquired in accordance with whether the connected printer 1000 is a color printer or monochrome printer.

In step S1022, whether the application to be loaded has already been executed is determined. If the application to be loaded has already been loaded and can be activated, the process advances to step S1023 to acquire version information of the loaded application. In step S1024, version information of the loaded application that has been acquired in step S1023 and version information of the application program at the acquisition destination acquired in step S1021 are compared. If the version of the loaded program is older, the process advances to step S1025 to switch the application acquisition destination (storage destination) so as to load the application program of a newer version. At this time, the application of an older version may be deleted.

If the application to be loaded is determined in step S1022 not to be activated, the process advances to step S1025 to switch the application acquisition destination so as to load the application program.

If the version of the loaded application program and that of the application program at the acquisition destination coincide with each other or the version of the loaded application program is newer as a result of version comparison in step S1024, no application program need be loaded. The process advances to step S410 without executing any process, and the application is activated.

As described above, according to the ninth embodiment, when the version of a loaded application is older than that of an application program present in the printer controller upon reception of an activation request for an application registered in the network print server 1500, the application program of a newer version is automatically loaded and executed.

10th Embodiment

Figure 25:
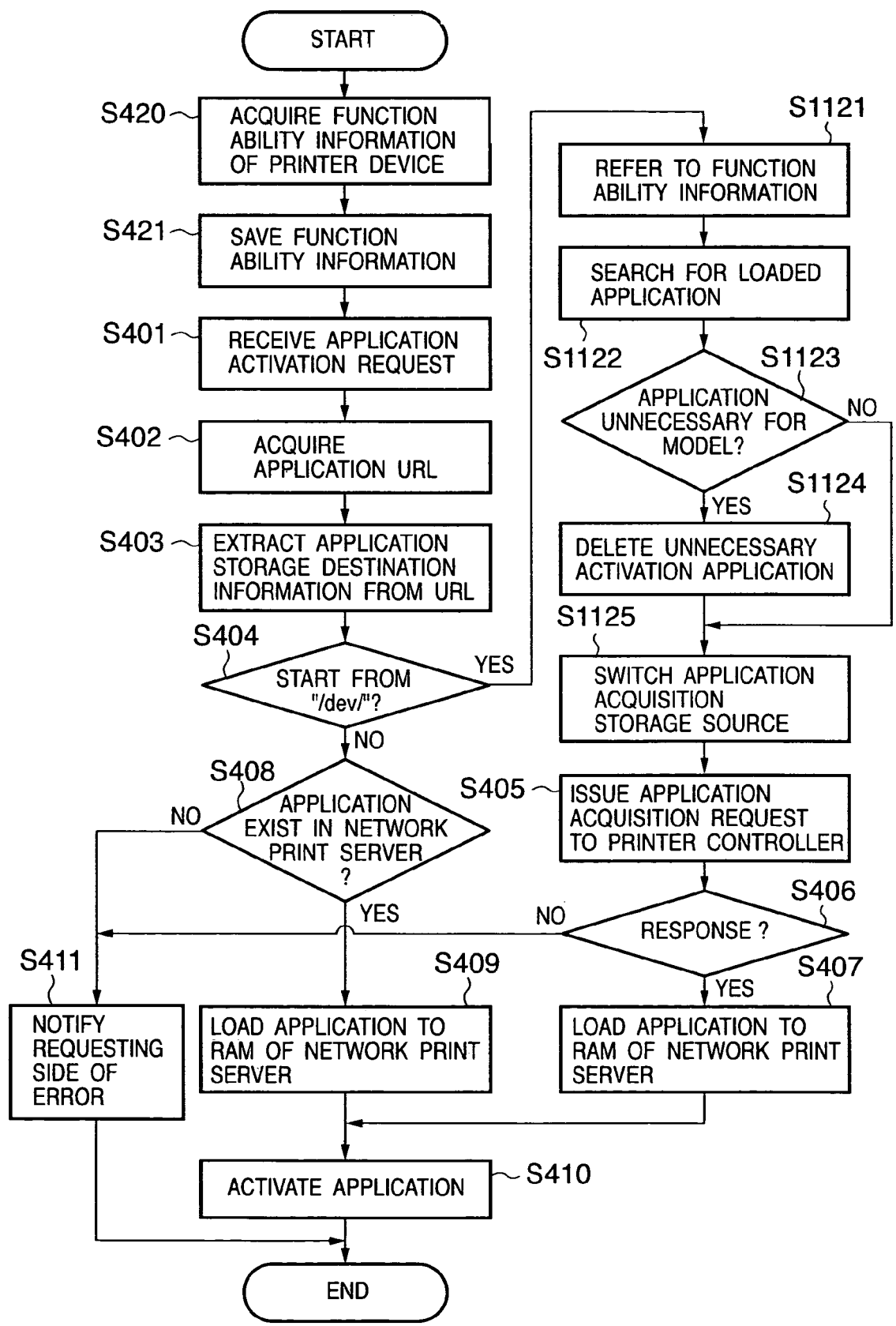
FIG. 25 is a flowchart showing an application program activation process method according to the 10th embodiment.

The 10th embodiment is related to deletion of an unnecessary application program. FIG. 25 is a flowchart showing an automatic deletion process for an application program which runs in a network print server 1500 according to the 10th embodiment. A control program for causing a CPU 1 of the network print server 1500 to execute process steps in FIG. 25 is stored in a Flash ROM 3 of the network print server 1500. Steps S401 to S411, S420, and S421 are the same as those in the sixth embodiment (FIG. 20).

If the character string of storage destination information starts from "/dev/" in step S404, the storage destination of an application whose activation is requested is determined to be a printer controller 1600., and the process advances to step S1121. In step S1121, function ability information of a printer 1000 is referred to. In this case, whether the function ability of the printer 1000 represents color printing is determined. When the function ability of the printer 1000 is determined to represent color printing or monochrome printing, either a color module or monochrome module becomes an unnecessary application. A loaded application program is searched in step S1122, and whether an unnecessary application exists in terms of the function ability is determined in step S1123. In the 10th embodiment, an unnecessary application programs is extracted from application programs searched in step S1122 in accordance with whether the connected printer 1000 is a color printer or monochrome printer. The function ability is not limited to color/monochrome printing.

If an unnecessary application program is detected, the process advances to step S1124 to delete it, and then to step S1125. If no unnecessary application is detected, the process directly advances from step S1123 to step S1125. The application acquisition destination is switched in step S1125, and the process advances to step S405. In step S405, an acquisition request for an application program designated in step S1125 is issued to the printer controller 1600 by using the API as shown in FIG. 19.

In the above embodiments, the process is switched by checking whether the function of the printer 1000 represents color printing or monochrome printing. However, the present invention is not limited to this. Device abilities include the processible number of color tones, processible resolution, emulation function, and stapling function, as shown in Table 1. As for the color tone, the number of colors, resolution, and the like, it is possible to switch part of an application process that is influenced by the ability of a connected printer, and not to convert uninfluenced part. An alternative process corresponding to the ability of the model of the "influenced part" is created so that no error occurs in the operation of the application of the "uninfluenced part". As for the emulation function and stapling function, these functions are not provided, and another alternative process is executed. Data switching to an equipped emulator may be performed, or banner process printing may be added for stapling.

TABLE 1

| Device Ability Information | Application |
|---|---|
| Color Printer or Monochrome Printer | calibration process (color or grayscale) |
| Processible Color Tone (1/2/4 bit) | image process for each tone |
| Processible Resolution (300/600/1,200 dpi) | image process for each resolution |
| Mounting of Optional Emulation | switching of emulation used |
| Mounting of Stapling Device | addition of stapling process or banner printing |

As described in detail above, according to the sixth to 10th embodiments, when a network card module which has a Java application program function aiming at efficient resource distribution by giving a model-dependent part to a printer and has been mounted in a given printer is moved to another printer (of a different model or with different settings), the operation conditions of an application in the network card module are automatically divided in accordance with a combination of the printer and system (function and ability). Moreover, an application registered in the network card module is automatically deleted or updated in accordance with a combination of the printer and system (function and ability). Consequently, the degree of freedom in execution of an application can be increased, and the resource can be effectively exploited. Execution of deletion of an unnecessary application (including determination of whether an application to be deleted exists) is not limited to the timing shown in FIG. 25, and deletion may be executed at an arbitrary timing.

11th Embodiment

In the eighth embodiment, when a program instruction to be processed depends on the printer controller in executing an application, the program instruction is converted into an instruction code for an alternative process on the basis of function ability information of the printer. In the 11th embodiment, when a printer controller-dependent instruction can be alternatively executed by an external peripheral device 22 connected to a network print server 1500 in processing the instruction, the instruction is processed by the external peripheral device 22. In this fashion, the external peripheral device 22 can be utilized.

The network print server 1500 can communicate with the external peripheral device 22 connected via an external peripheral device interface 21. Also, the network print server 1500 can control the external peripheral device 22. In the 11th embodiment, a "printer panel device" is connected as the external peripheral device 22. Even when the printer itself does not have any display panel from the description of a line 302 in FIG. 3, a process result designated by a line 301 can be output to display it on the LCD display of the external peripheral device 22 (printer panel device).

Figure 26:
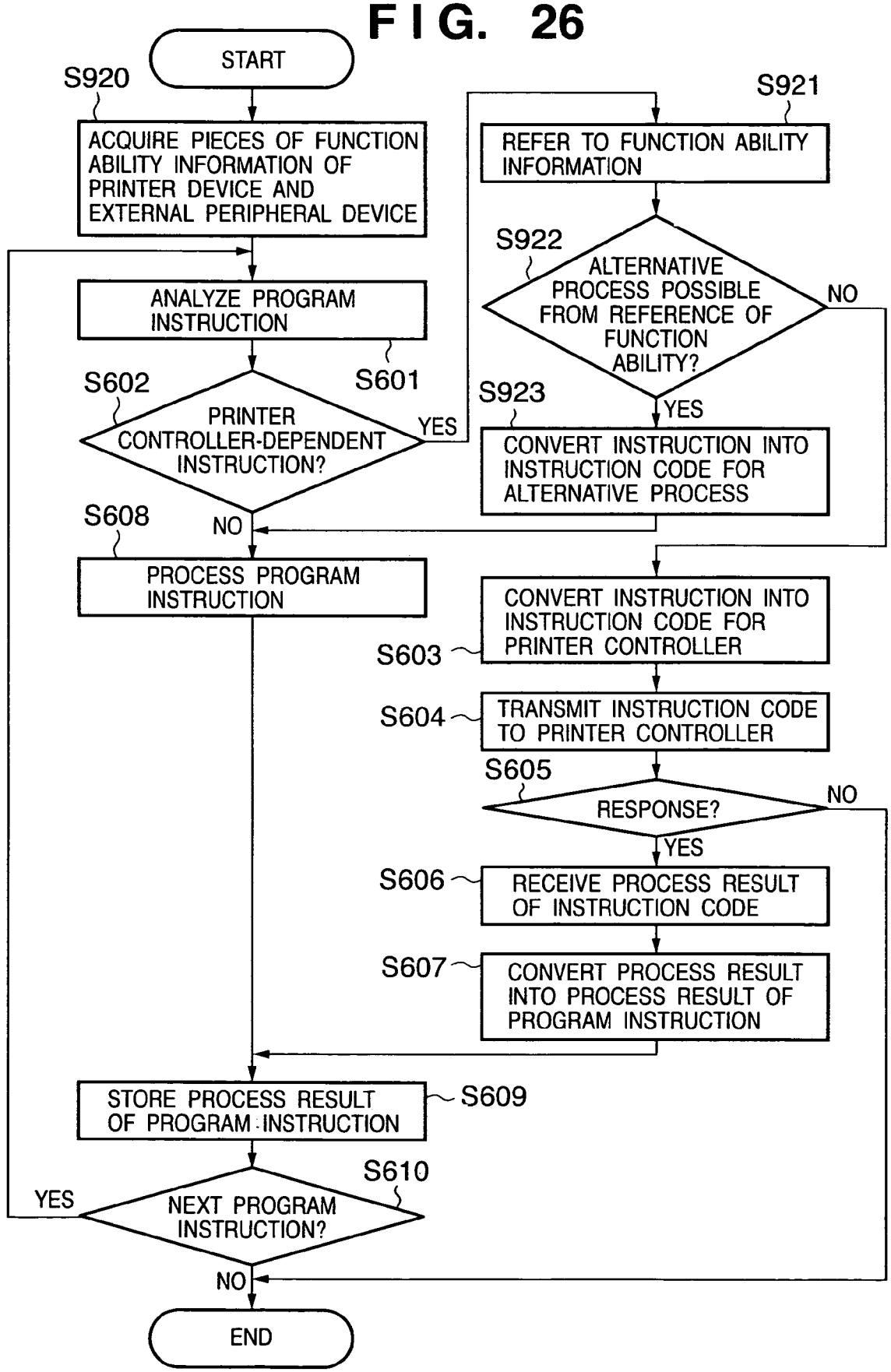
FIG. 26 is a flowchart showing a process method for an instruction described in an application program according to the 11th embodiment.

FIG. 26 is a flowchart showing a process method for an instruction described in an application program which runs in the network print server 1500 according to the 11th embodiment. FIG. 26 especially exemplifies a case in which an alternative function process in the device is performed. In FIG. 26, the same step numbers as those in FIG. 22 denote the same processes. Control procedures corresponding to the steps are stored in a Flash ROM 3 of the network print server 1500.

When an application program is activated by the process in FIG. 20 or 21, function ability information of the printer is acquired in step S920. For example, the function ability information represents whether the printer has a panel function, is a color printer, has a maximum speed of 20 sheets/min, or has a resolution of 600 dpi. In the 11th embodiment, function ability information of a connected external peripheral device is also acquired. In the 11th embodiment, an external peripheral device having the panel function is connected. The acquired function ability information is saved in the storage area of the network print server so as to be able to refer to it from a subsequent program.

An instruction contained in an application program is analyzed in step S601, and whether the instruction type is an instruction depending on a printer controller 1600 is determined in step S602. If the instruction type is determined to be a printer controller-dependent instruction, the process advances to step S921 to refer to the function ability information acquired in step S920. If the instruction is determined in step S922 not to be processible by the printer controller 1600 but to be alternatively processible by the external peripheral device 22, the process advances to step S923 to convert the instruction to an instruction code for the alternative process. The process advances to step S608 to cause the network print server 1500 to execute the instruction; otherwise, the process advances from step S922 to step S603.

For example, when the instruction is to display information on the panel and the printer does not have any panel, the printer cannot execute this instruction. Thus, whether a panel is connected to the external peripheral device interface of the network print server is determined from function information on the external peripheral device. When the external peripheral device 22 having the panel function is determined to be connected, like the 11th embodiment, the network print server converts the instruction into an instruction code (calls a function for the alternative function) so as to cause the panel to alternatively process the instruction. The network print server 1500 executes the instruction code.

The remaining processes are the same as those in the eighth embodiment, and a description thereof will be omitted.

As described above in detail, even when a network card module which has a Java application program function aiming at efficient resource distribution by giving a model-dependent part to a printer is to be mounted in a commercially available printer, i.e., it is difficult to give the printer a resource, the Java application of the network card module can perform an alternative function process for the printer by using an external peripheral device. A new function can be added without altering an existing printer. Furthermore, a wider range of functions can be added by providing an external peripheral device interface to the network card module and controlling a mounted external peripheral device by the network card module.

As described above, according to the sixth to 11th embodiments, an error upon movement and wasteful use of the resource can be further solved.

According to the sixth to 11th embodiments, wasteful use of the resource can be further solved by automatically deleting an unnecessary one of registered applications upon movement or performing an automatic update process.

According to the sixth to 11th embodiments, some processes of a model-dependent part are performed by the network module, or an external peripheral device connected to the network module is controlled. The application can, therefore, add a new function which has not been provided to the data processing apparatus.

Other Embodiment

In the first, second, fourth, fifth, sixth, and seventh embodiments, the application program storage destination determination method specifies a storage destination on the basis of whether "/dev/" exists in a character string extracted from a URL. However, since the URL describes the storage destination as a character string according to this method, this method is not proper when the storage destination is to be hidden as internal information. As a measure, a table which can identify a storage destination for the name of each application program may be held in advance in the storage of the network print server, and the storage destination may be specified on the basis of the table information. According to this method, the URL need not contain any character string representing a storage destination, and storage destination information can be hidden.

In the above description, the network apparatus according to the present invention is implemented by the network card module (network print server 1500). However, the implementation is not limited to the card and can take any form such as a cartridge type as far as the module is detachable from the data processing apparatus main body.

As the network apparatus of the present invention, the module (network print server 1500) which is mounted in the printer has been described. However, an application of the network apparatus is not limited to the printer. For example, the network apparatus can be applied to various data processing apparatuses such as a copying machine and facsimile apparatus.

The license code+equipment information code form the authentication code in the fourth and fifth embodiments, but only the equipment information code may be adopted as the authentication code. The license code and authentication code are expressed by texts for descriptive convenience in the above embodiments, but may be encrypted and held. In the above embodiments, the license code+equipment information are compared as the authentication code. Alternatively, only the license code is used for authentication, and equipment information may be used for only a comparison with the current equipment state.

As described above, according to the above embodiments, the storage destination of an application program module which can run in the network card module is changed in accordance with the type of application program. More specifically, a model-independent (common) program is stored in the storage device (e.g., Flash ROM) of the network card module, whereas a model-dependent program is stored in the storage device of the printing apparatus main body (printer controller). The storage devices of the network card module and printing apparatus main body can be more efficiently utilized. In other words, the save destinations of application programs can be distributed in accordance with whether the application program depends on the model. The network card serving as a common module need not hold any unnecessary data, and the storage capacity of the network card module can be reduced. From another viewpoint, since no model-dependent application is held in the network card module, this can prevent any error such as erroneous activation, by the user, of an application program which runs in only another model.

In the above configuration, a license code input in adding the application program from a host computer or the like is stored in the storage device of the printing apparatus main body and the storage device (e.g., Flash ROM) of the network card module. The license code can be used to determine whether the application program module is appropriate for the printing apparatus and network card module.

According to the above embodiments, the application program is controlled not to be activated unless it has normally been installed in a combination of the printing apparatus and network card module. This can prevent activation of an unavailable application program when only the network card module is mounted in another printing apparatus without normally installing any application. Also, this can prevent activation of an application which does not normally operate depending on the equipment of the printing apparatus.

In executing an application program, instruction processes can be efficiently achieved because they can be distributed to the network card module and printing apparatus main body in accordance with the type of instruction in the program. Unique information which is associated with an instruction process and contains information depending on the model of the printing apparatus main body need not be held in the network card module. The program capacity of the network card module can be reduced. Even if a new printing apparatus main body is added, the network card module need not be altered, contributing to improving the diversion.

In the above embodiments, a change of an activation application or conversion of an instruction (function) may use, e.g., a table which registers the application or instruction (function).

From another viewpoint, since no model-dependent application is held in the network card module (network print server), this can prevent any error such as erroneous activation, by the user, of an application program which runs in only another model.

As many apparently widely different embodiments of the present invention can be made without departing from the spirit and scope thereof, it is to be understood that the invention is not limited to the specific embodiments thereof except as defined in the appended claims.

What is claimed is:

1. A network apparatus, comprising:
 a first interface unit configured to connect the network apparatus to a network;
 a connecting unit configured to enable the network apparatus to be detachable from a data processing apparatus;
 a second interface unit configured to electrically connect the network apparatus and the data processing apparatus when the network apparatus is mounted to the data processing apparatus by the connecting unit;
 an installation unit configured to install an application and store authentication information, a license code received via the network, corresponding to the application in a storage of the network apparatus;
 an acquisition unit configured to acquire authentication information corresponding to an application whose activation is designated, from the storage of the network apparatus and the data processing apparatus in which the network apparatus is mounted;
 a determination unit configured to determine whether or not the application whose activation has been designated is permitted to be activated based on a comparison result of comparing the authentication information acquired from the storage unit of the network apparatus and the authentication information acquired from the data processing apparatus in which the network apparatus is mounted; and
 an activating unit configured to activate the designated application when the determination step determines that the application is permitted to be activated, and to issue an error notification when the determination unit determines that the designated application is not permitted to be activated, wherein said installation unit acquires equipment information corresponding to a hardware configuration of the data processing apparatus from the data processing apparatus, converts the equipment information into a code and sets the code as the authentication information and said determination unit determines to permit activation of the application when equipment information recorded in the storage unit by the installation unit and current equipment information of the data processing apparatus coincide with each other.

2. The apparatus according to claim 1, wherein said installation unit activates in accordance with an installer activation request received from a client via the network, transmits, to the client, data for displaying a predetermined user interface window in the client, installs an application program designated using the user interface window, receives a license code input using the user interface window, and further set the license code in the storage unit as at least part of the authentication information.

3. A control method for a network apparatus, comprising:

an installation step of installing an application and storing authentication information, a license code received via a network, corresponding to the application in a storage unit of the network apparatus;

an acquisition step of acquiring authentication information corresponding to an application whose activation is designated, from the storage unit of the network apparatus and from the data processing apparatus in which the network apparatus is mounted;

a determination step of determining whether or not the application whose activation has been designated is permitted to be activated based on a comparison result of comparing the authentication information acquired from the storage unit of the network apparatus and the authentication information acquired from the data processing apparatus; and an activating step of activating the designated application when the determination step determines that the application is permitted to be activated, and issuing an error notification when the determination step determines that the designated application is not permitted to be activated, wherein the network apparatus has a first interface unit configured to connect the network apparatus to the network, a connecting unit to enable the network the network apparatus to be detachable from the data processing apparatus, and a second interface unit configured to electrically connect the network apparatus and the data processing apparatus when the network apparatus is mounted to the data processing apparatus via the connecting unit, wherein said installation step acquires equipment information corresponding to a hardware configuration of the data processing apparatus from the data processing apparatus, converts the equipment information into a code and sets the code as the authentication information and said determination unit determines to permit activation of the application when equipment information recorded in the storage unit by the installation unit and current equipment information of the data processing apparatus coincide with each other.

* * * * *